US012610425B2

(12) United States Patent
Niu et al.

(10) Patent No.: US 12,610,425 B2
(45) Date of Patent: Apr. 21, 2026

(54) MULTIPLE CDRX CONFIGURATIONS AND DYNAMIC CONFIGURATION SWITCHING FOR XR TRAFFIC

(71) Applicant: Apple Inc., Cupertino, CA (US)

(72) Inventors: Huaning Niu, San Jose, CA (US); Chunhai Yao, Beijing (CN); Chunxuan Ye, San Diego, CA (US); Dawei Zhang, Saratoga, CA (US); Haitong Sun, Cupertino, CA (US); Hong He, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 522 days.

(21) Appl. No.: 17/909,328

(22) PCT Filed: Sep. 24, 2021

(86) PCT No.: PCT/CN2021/120329
§ 371 (c)(1),
(2) Date: Sep. 2, 2022

(87) PCT Pub. No.: WO2023/044757
PCT Pub. Date: Mar. 30, 2023

(65) Prior Publication Data
US 2024/0206004 A1      Jun. 20, 2024

(51) Int. Cl.
*H04W 76/28*       (2018.01)
*H04W 72/11*       (2023.01)

(52) U.S. Cl.
CPC ............ *H04W 76/28* (2018.02); *H04W 72/11* (2023.01)

(58) Field of Classification Search
CPC .... H04W 76/28; H04W 72/11; H04W 72/115
See application file for complete search history.

(56) References Cited

U.S. PATENT DOCUMENTS

| | | | |
|---|---|---|---|
| 2010/0195605 A1 | 8/2010 | Suzuki et al. | |
| 2019/0207737 A1 | 7/2019 | Babaei et al. | |
| (Continued) | | | |

FOREIGN PATENT DOCUMENTS

| | | |
|---|---|---|
| CN | 101483925 A | 7/2009 |
| CN | 110383898 A | 10/2019 |
| (Continued) | | |

OTHER PUBLICATIONS

Moderator's Summary For Discussion, Nokia, [RAN93e-R18Prep-05] XR evolution, 3GPP TSG RAN#93e RP-211655, Sep. 17, 2021, pp. 1-68.

(Continued)

*Primary Examiner* — Steven Hieu D Nguyen
(74) *Attorney, Agent, or Firm* — Kilpatrick Townsend & Stockton LLP

(57) ABSTRACT

Provided is a method for a user equipment (UE). The UE obtains a Discontinuous Reception (DRX) switching command from a network device and switches, based on the DRX switching command, from a current first Connected Mode DRX (cDRX) configuration to a different second cDRX configuration. Each of the first cDRX configuration and the second cDRX configuration is a configuration selected from a group consisting of: a default cDRX configuration; and at least one non-default cDRX configuration. Each non-default cDRX configuration of the at least one non-default cDRX configuration comprises a cDRX periodicity and a cDRX offset corresponding to a periodicity and an offset of a Semi-Persistent Scheduling (SPS) or Configured Grant (CG) configuration, respectively.

20 Claims, 11 Drawing Sheets

<u>200</u>

S202
OBTAINING, FROM A NETWORK DEVICE, A DRX SWITCHING COMMAND

S204
SWITCHING, BASED ON THE DRX SWITCHING COMMAND, FROM A CURRENT FIRST CDRX CONFIGURATION TO A DIFFERENT SECOND CDRX CONFIGURATION, EACH OF THE FIRST AND SECOND CDRX CONFIGURATION BEING SELECTED FROM A GROUP CONSISTING OF AT LEAST ONE NON-DEFAULT CDRX CONFIGURATION AND A DEFAULT CDRX CONFIGURATION

(56)     References Cited

U.S. PATENT DOCUMENTS

| | | | |
|---|---|---|---|
| 2020/0245395 | A1 | 7/2020 | Zhang et al. |
| 2020/0260310 | A1* | 8/2020 | Kim .......................... H04W 4/70 |
| 2020/0383127 | A1 | 12/2020 | Zhu et al. |
| 2021/0289583 | A1 | 9/2021 | Zhang et al. |
| 2021/0307108 | A1* | 9/2021 | Babaei ................... H04W 76/18 |
| 2021/0360674 | A1* | 11/2021 | Lim .................. H04W 52/0216 |
| 2021/0377852 | A1* | 12/2021 | Zhou ................. H04W 52/0235 |
| 2022/0377833 | A1* | 11/2022 | Dimou .................. H04W 24/08 |
| 2022/0394734 | A1* | 12/2022 | MolavianJazi ... H04W 72/0446 |
| 2023/0042702 | A1* | 2/2023 | Kim ...................... H04W 24/02 |
| 2023/0239818 | A1* | 7/2023 | Tsuda ............... H04W 56/0015 |
| | | | 370/503 |

FOREIGN PATENT DOCUMENTS

| | | | |
|---|---|---|---|
| CN | 111565443 A | 8/2020 | |
| CN | 112567670 A | 3/2021 | |
| WO | WO-2020029230 A1 * | 2/2020 | ............. H04L 5/001 |
| WO | 2020122788 A1 | 6/2020 | |
| WO | 2020223654 A1 | 11/2020 | |
| WO | 2020223654 A4 | 12/2020 | |
| WO | 2021097277 A1 | 5/2021 | |

OTHER PUBLICATIONS

International Patent Application No. PCT/CN2021/120329, International Search Report and Written Opinion, Mailed on Jun. 23, 2022, 9 pages.
International Patent Application No. PCT/CN2021/120329, International Preliminary Report on Patentability, Apr. 4, 2024, 6 pages.
European Patent Application No. 21957887.9, Extended European Search Report, Apr. 16, 2025, 9 pages.
On Drx, Lcp, Timing, Harq, Sr/bsr, and Cg and Sps, Ericsson, 3rd Generation Partnership Project Technical Specification Group-Radio Access Network Working Group#114-e R2-2106089, Electronic Meeting, May 19-27, 2021, pp. 1-36.
China Patent Application No. 202180020579.6, Office Action, Jun. 25, 2025, 25 pages.
Zhang et al., Enhanced Discontinuous Reception Mechanism for Power Saving in Td-lte, Application Research of Computers, vol. 27, No. 12, Dec. 15, 2010, 4 pages.

* cited by examiner

200

OBTAINING, FROM A NETWORK DEVICE, A DRX
SWITCHING COMMAND

S202

SWITCHING, BASED ON THE DRX SWITCHING COMMAND,
FROM A CURRENT FIRST CDRX CONFIGURATION TO A
DIFFERENT SECOND CDRX CONFIGURATION, EACH OF THE
FIRST AND SECOND CDRX CONFIGURATION BEING
SELECTED FROM A GROUP CONSISTING OF AT LEAST ONE
NON-DEFAULT CDRX CONFIGURATION AND A DEFAULT
CDRX CONFIGURATION

S204

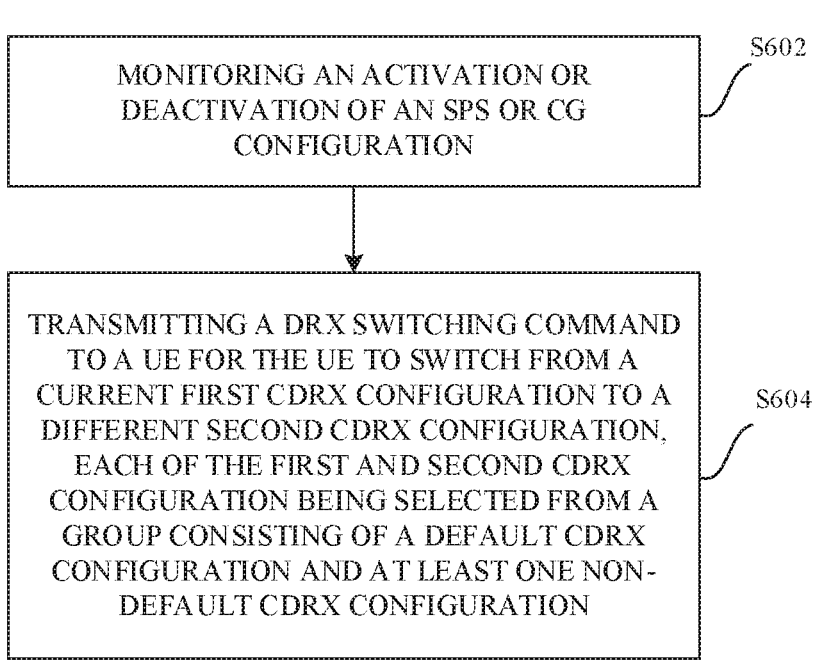

600

MONITORING AN ACTIVATION OR
DEACTIVATION OF AN SPS OR CG
CONFIGURATION

S602

TRANSMITTING A DRX SWITCHING COMMAND
TO A UE FOR THE UE TO SWITCH FROM A
CURRENT FIRST CDRX CONFIGURATION TO A
DIFFERENT SECOND CDRX CONFIGURATION,
EACH OF THE FIRST AND SECOND CDRX
CONFIGURATION BEING SELECTED FROM A
GROUP CONSISTING OF A DEFAULT CDRX
CONFIGURATION AND AT LEAST ONE NON-
DEFAULT CDRX CONFIGURATION

MULTIPLE CDRX CONFIGURATIONS AND DYNAMIC CONFIGURATION SWITCHING FOR XR TRAFFIC

CROSS REFERENCE TO RELATED APPLICATION

This application is a 371 U.S. National Phase of PCT International Patent Application No. PCT/CN2021/120329, filed Sep. 24, 2021, which is herein incorporated by reference in its entirety for all purposes.

TECHNICAL FIELD

This application relates generally to wireless communication systems, and more specifically to multiple Connected Mode Discontinuous Reception (DRX) (cDRX) configurations and dynamic configuration switching for XR traffic.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); fifth-generation (5G) 3GPP new radio (NR) standard; the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB), which communicate with a wireless communication device, also known as user equipment (UE).

SUMMARY

According to an aspect of the present disclosure, a method for a user equipment (UE) is provided that includes: obtaining a Discontinuous Reception (DRX) switching command from a network device; and switching, based on the DRX switching command, from a current first Connected Mode DRX (cDRX) configuration to a different second cDRX configuration. Each of the first cDRX configuration and the second cDRX configuration is a configuration selected from a group consisting of: a default cDRX configuration; and at least one non-default cDRX configuration, and each non-default cDRX configuration of the at least one non-default cDRX configuration comprises a cDRX periodicity and a cDRX offset corresponding to a periodicity and an offset of a Semi-Persistent Scheduling (SPS) or Configured Grant (CG) configuration, respectively.

According to an aspect of the present disclosure, a method for a network device is provided that includes: monitoring an activation or deactivation of an Semi-Persistent Scheduling (SPS) or Configured Grant (CG) configuration; and transmitting, based on the activation or deactivation of the SPS or CG configuration, a Discontinuous Reception (DRX) switching command to a user equipment (UE) for the UE to switch from a current first Connected Mode DRX (cDRX) configuration to a different second cDRX configuration. Each of the first cDRX configuration and the second cDRX configuration is a configuration selected from a group consisting of: a default cDRX configuration; and at least one non-default cDRX configuration, and each non-default cDRX configuration of the at least one non-default cDRX configuration comprises a cDRX periodicity and a cDRX offset corresponding to a periodicity and an offset of the SPS or CG configuration, respectively.

According to an aspect of the present disclosure, an apparatus for a user equipment (UE) is provided that includes one or more processors configured to perform steps of the method according to the present disclosure.

According to an aspect of the present disclosure, an apparatus of a network device is provided that includes one or more processors configured to perform steps of the method according to the present disclosure.

According to an aspect of the present disclosure, a computer readable medium is provided that has computer programs stored thereon, which when executed by one or more processors, cause an apparatus to perform steps of the method according to the present disclosure.

According to an aspect of the present disclosure, an apparatus for a communication device is provided that includes means for performing steps of the method according to perform steps of the method according to the present disclosure.

According to an aspect of the present disclosure, a computer program product is provided that includes computer programs which, when executed by one or more processors, cause an apparatus to perform steps of the method according to the present disclosure.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure.

FIG. 6 illustrates a flowchart for an exemplary method for a network device in accordance with some embodiments.

DETAILED DESCRIPTION

In the present disclosure, a "base station" can include a RAN Node such as an Evolved Universal Terrestrial Radio Access Network (E-UTRAN) Node B (also commonly denoted as evolved Node B, enhanced Node B, eNodeB, or eNB) and/or Radio Network Controller (RNC), and/or a 5G Node, new radio (NR) node or g Node B (gNB), which communicate with a wireless communication device, also known as user equipment (UE). Although some examples may be described with reference to any of E-UTRAN Node B, an eNB, an RNC and/or a gNB, such devices may be replaced with any type of base station.

In wireless communication, a Medium Access Control (MAC) entity may be configured by RRC with a DRX functionality that controls the UE's PDCCH monitoring activity for the MAC entity's C-RNTI, CS-RNTI, INT-RNTI, SFI-RNTI, SP-CSI-RNTI, TPC-PUCCH-RNTI, TPC-PUSCH-RNTI, and TPC-SRS-RNTI. When using DRX operation, the MAC entity shall also monitor PDCCH according to requirements found in other subclauses of this specification. When in RRC_CONNECTED, if DRX is configured, for all the activated Serving Cells, the MAC entity may monitor the PDCCH discontinuously using the DRX operation specified in this subclause; otherwise, the MAC entity shall monitor the PDCCH as specified in TS 38.213. A Connected Mode DRX can be known as a cDRX.

Figure 1:
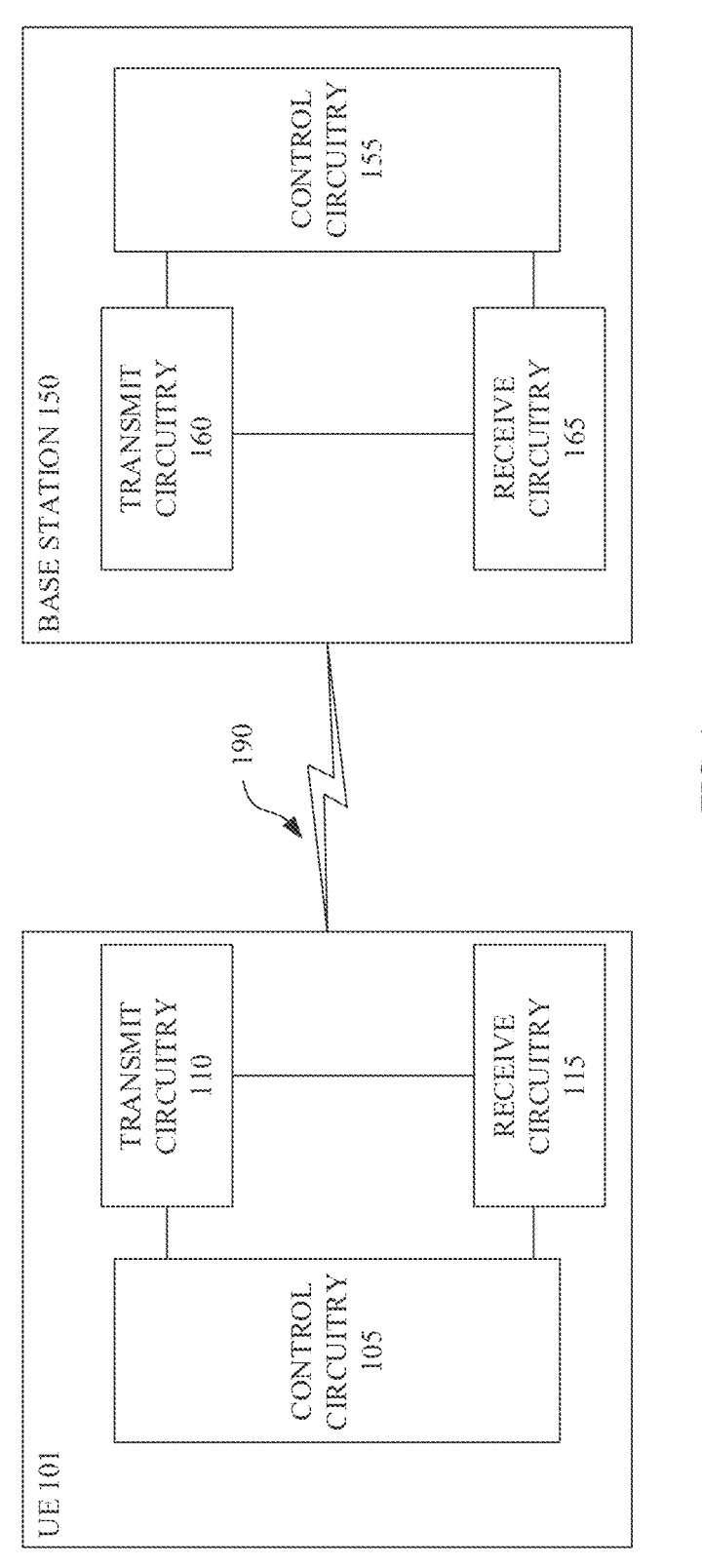
FIG. 1 is a block diagram of a system including a base station and a user equipment (UE) in accordance with some embodiments.

FIG. 1 illustrates a wireless network 100, in accordance with some embodiments. The wireless network 100 includes a UE 101 and a base station 150 connected via an air interface 190.

The UE 101 and any other UE in the system may be, for example, laptop computers, smartphones, tablet computers, printers, machine-type devices such as smart meters or specialized devices for healthcare monitoring, remote security surveillance, an intelligent transportation system, or any other wireless devices with or without a user interface. The base station 150 provides network connectivity to a broader network (not shown) to the UE 101 via the air interface 190 in a base station service area provided by the base station 150. In some embodiments, such a broader network may be a wide area network operated by a cellular network provider, or may be the Internet. Each base station service area associated with the base station 150 is supported by antennas integrated with the base station 150. The service areas are divided into a number of sectors associated with certain antennas. Such sectors may be physically associated with fixed antennas or may be assigned to a physical area with tunable antennas or antenna settings adjustable in a beamforming process used to direct a signal to a particular sector. One embodiment of the base station 150, for example, includes three sectors each covering a 120-degree area with an array of antennas directed to each sector to provide 360-degree coverage around the base station 150.

The UE 101 includes control circuitry 105 coupled with transmit circuitry 110 and receive circuitry 115. The transmit circuitry 110 and receive circuitry 115 may each be coupled with one or more antennas. The control circuitry 105 may be adapted to perform operations associated with MTC. In some embodiments, the control circuitry 105 of the UE 101 may perform calculations or may initiate measurements associated with the air interface 190 to determine a channel quality of the available connection to the base station 150. These calculations may be performed in conjunction with control circuitry 155 of the base station 150. The transmit circuitry 110 and receive circuitry 115 may be adapted to transmit and receive data, respectively. The control circuitry 105 may be adapted or configured to perform various operations such as those described elsewhere in this disclosure related to a UE. The transmit circuitry 110 may transmit a plurality of multiplexed uplink physical channels. The plurality of uplink physical channels may be multiplexed according to time division multiplexing (TDM) or frequency division multiplexing (FDM). The transmit circuitry 110 may be configured to receive block data from the control circuitry 105 for transmission across the air interface 190. Similarly, the receive circuitry 115 may receive a plurality of multiplexed downlink physical channels from the air interface 190 and relay the physical channels to the control circuitry 105. The uplink and downlink physical channels may be multiplexed according to TDM or FDM. The transmit circuitry 110 and the receive circuitry 115 may transmit and receive both control data and content data (e.g., messages, images, video, et cetera) structured within data blocks that are carried by the physical channels.

FIG. 1 also illustrates the base station 150, in accordance with various embodiments. The base station 150 circuitry may include control circuitry 155 coupled with transmit circuitry 160 and receive circuitry 165. The transmit circuitry 160 and receive circuitry 165 may each be coupled with one or more antennas that may be used to enable communications via the air interface 190.

The control circuitry 155 may be adapted to perform operations associated with MTC. The transmit circuitry 160 and receive circuitry 165 may be adapted to transmit and receive data, respectively, within a narrow system bandwidth that is narrower than a standard bandwidth structured for person-to-person communication. In some embodiments, for example, a transmission bandwidth may be set at or near 1.4 MHz. In other embodiments, other bandwidths may be used. The control circuitry 155 may perform various operations such as those described elsewhere in this disclosure related to a base station.

Within the narrow system bandwidth, the transmit circuitry 160 may transmit a plurality of multiplexed downlink physical channels. The plurality of downlink physical channels may be multiplexed according to TDM or FDM. The transmit circuitry 160 may transmit the plurality of multiplexed downlink physical channels in a downlink superframe that is included of a plurality of downlink subframes.

Within the narrow system bandwidth, the receive circuitry 165 may receive a plurality of multiplexed uplink physical channels. The plurality of uplink physical channels may be multiplexed according to TDM or FDM. The receive circuitry 165 may receive the plurality of multiplexed uplink physical channels in an uplink super-frame that is included of a plurality of uplink subframes.

As described further below, the control circuitry 105 and 155 may be involved with measurement of a channel quality for the air interface 190. The channel quality may, for example, be based on physical obstructions between the UE 101 and the base station 150, electromagnetic signal interference from other sources, reflections or indirect paths between the UE 101 and the base station 150, or other such sources of signal noise. Based on the channel quality, a block of data may be scheduled to be retransmitted multiple times, such that the transmit circuitry 110 may transmit copies of the same data multiple times and the receive circuitry 115 may receive multiple copies of the same data multiple times.

The UE and the network device described in the following embodiments may be implemented by the UE 101 and the base station 150 described in FIG. 1.

Figure 2:
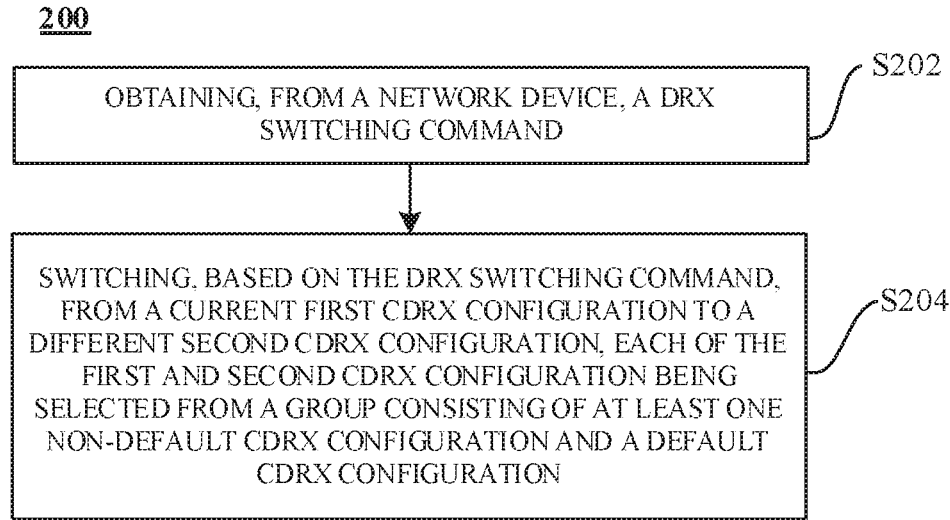
FIG. 2 illustrates a flowchart for an exemplary method for a user equipment in accordance with some embodiments.

FIG. 2 illustrates a flowchart for an exemplary method for a user equipment in accordance with some embodiments. The method 200 illustrated in FIG. 2 may be implemented by the UE 101 described in FIG. 1.

In some embodiments, the method 200 for UE may include the following steps: S202, obtaining, from a network device, a Discontinuous Reception (DRX) switching command; S204, switching, based on the DRX switching command, from a current first Connected Mode DRX (cDRX) configuration to a different second cDRX configuration, each of the first cDRX configuration and the second cDRX configuration being a configuration selected from a group consisting of a default cDRX configuration and at least one non-default cDRX configuration, each non-default cDRX configuration of the at least one non-default cDRX configuration including a cDRX periodicity and a cDRX offset corresponding to a periodicity and an offset of a Semi-Persistent Scheduling (SPS) or Configured Grant (CG) configuration, respectively.

UE power saving has been one key design optimization aspect for XR traffic. To enable UE power saving, it is desirable to align cDRX with XR SPS traffic, so that UE wakes up once and finishes DG, SPS/CG, and DL measurement, RLM measurement and other CSI feedback. On the other hand, a UE that wakes up outside of cDRX for SPS traffic consumes more power. According to some embodiments of the present disclosure, the wake-up and sleep pattern of a UE can be switched to align with the SPS or CG configuration to facilitate UE power saving.

In the following, each step of the method 200 will be described in detail.

At step S202, obtaining, from a network device, a Discontinuous Reception (DRX) switching command.

At step S204, switching, based on the DRX switching command, from a current first Connected Mode DRX (cDRX) configuration to a different second cDRX configuration, each of the first cDRX configuration and the second cDRX configuration is a configuration selected from a group consisting of at least one non-default cDRX configuration and a default cDRX configuration. Each non-default cDRX configuration of the at least one non-default cDRX configuration comprises a cDRX periodicity and a cDRX offset corresponding to a periodicity and an offset of a Semi-Persistent Scheduling (SPS) or Configured Grant (CG) configuration, respectively.

In a case where one cDRX group is configured, e.g., in the Release 15 (R15) standard, multiple cDRX configurations can be configured in the cDRX group. Per cell, multiple cDRX configuration can be configured, and one cDRX configuration is active at one time.

According to some embodiments, each non-default cDRX configuration of the at least one non-default cDRX configuration is different from the default cDRX configuration in one or more parameters selected from a group consisting of: a DRX on-duration timer, a DRX inactivity timer, a DRX slot offset, and a DRX retransmission timer. For example, a default cDRX configuration can be configured with loner cycle and thus less frequency to wake up. At least one different non-default cDRX configuration can be configured, each having an offset and periodicity aligned with a possible SPS or CG configuration.

According to other embodiments, at least one, and in some examples all, of the DRX parameters listed below may be different for different cDRX configurations:

a DRX on-duration timer, drx-onDurationTimer;

a DRX inactivity timer, drx-Inactivity Timer;

a DRX slot offset, drx-SlotOffset;

a DRX retransmission timer, which may include e.g., a DRX retransmission timer for Downlink (DL) transmission drx-RetransmissionTimerDL and a DRX retransmission timer for Uplink (UL) transmission drx-RetransmissionTimerUL;

a DRX cycle start offset, drx-CycleStartOffset, or optionally donated as drx-LongCycleStartOffset in scenarios of non-integer periodicity of cDRX configuration where there is a potential shorter DRX cycle;

a Hybrid Automatic Repeat Request (HARQ) Round Trip Time (RTT) timer, which may include a HARQ RTT Timer for DL transmission, drx-HARQ-RTT-TimerDL, and a HARQ RTT Timer for UL transmission, drx-HARQ-RTT-TimerUL;

a shorter DRX cycle, drx-Short Cycle, optionally in scenarios of non-integer periodicity of cDRX configuration where there is a potential shorter DRX cycle; and a shorter DRX cycle timer, drx-ShortCycleTimer, optionally in scenarios of non-integer periodicity of cDRX configuration where there is a potential shorter DRX cycle.

Enabling non-integer cDRX periodicity belongs to a solution to align cDRX configuration with XR traffic. For XR service, audio and video streams can be generated at cadences which are not integer multiples of the NR's basic timing. For example, video stream generation may be at 60 frames per second. In this regard, one of non-integer periodicity of cDRX configurations may involve using long DRX and short DRX together to match XR traffic or using WUS (DCI format 2-6) to indicate XR traffic variation.

A DRX switching command may be a Medium Access Control (MAC) Control Element (CE), or may be a Downlink Control Information (DCI), including a non-scheduling DCI or scheduling based DCI. The DRX switching command may indicate the second cDRX configuration, e.g., the number or indicator of the new cDRX configuration to be switched on. Alternatively, in a case where there is one default configuration and one non-default, the DRX switching command may be a trigger, and switching from the first cDRX configuration to the second cDRX configuration may include toggling the status of cDRX configuration upon receiving the command.

3GPP Release 16 (R16) gives a cDRX configuration framework in R16 that one or two cDRX groups can be configured. Serving Cells (SC) of a MAC entity may be configured by RRC in two DRX groups with separate DRX parameters. In a case where RRC does not configure a secondary DRX group, only one DRX group is in use, and all Serving Cells belong to that one DRX group. In a case where two DRX groups are configured, each Serving Cell is uniquely assigned to either of the two groups.

For each of the two DRX groups, the following DRX parameters may be separately configured:

a DRX on-duration timer, drx-onDurationTimer; and a DRX inactivity timer, drx-Inactivity Timer.

DRX parameters that are common to the DRX groups may include:

a DRX slot offset, drx-SlotOffset;

a DRX retransmission timer, which may include e.g., a DRX retransmission timer for Downlink (DL) transmission drx-RetransmissionTimerDL and a DRX retransmission timer for Uplink (UL) transmission drx-Retransmission TimerUL;

a DRX cycle start offset, drx-CycleStartOffset, or optionally donated as drx-LongCycleStartOffset in scenarios of non-integer periodicity of cDRX configuration where there is a potential shorter DRX cycle;

a shorter DRX cycle, drx-Short Cycle, optionally in scenarios of non-integer periodicity of cDRX configuration where there is a potential shorter DRX cycle;

a shorter DRX cycle timer, drx-ShortCycleTimer, optionally in scenarios of non-integer periodicity of cDRX configuration where there is a potential shorter DRX cycle; and a Hybrid Automatic Repeat Request (HARQ) Round Trip Time (RTT) timer, which may include a HARQ RTT Timer for DL transmission, drx-HARQ-RTT-TimerDL, and a HARQ RTT Timer for UL transmission, drx-HARQ-RTT-TimerUL.

According to some embodiments of the present disclosure, in such a case where two cDRX groups are configured, multiple cDRX configurations can be configured in each cDRX group, where each cell may still belong to one cDRX group, while multiple cDRX configuration can be configured. Similarly, one cDRX configuration is active per cDRX group at one time.

According to some embodiments, at least one, and in some examples all, of the DRX parameters listed below may be different for different cDRX configurations:

a DRX on-duration timer, drx-onDurationTimer;

a DRX inactivity timer, drx-Inactivity Timer;

a DRX slot offset, drx-SlotOffset;

a DRX retransmission timer, which may include e.g., a DRX retransmission timer for Downlink (DL) transmission drx-RetransmissionTimerDL and a DRX retransmission timer for Uplink (UL) transmission drx-Retransmission TimerUL;

a DRX cycle start offset, drx-CycleStartOffset, or optionally donated as drx-LongCycleStartOffset in scenarios of non-integer periodicity of cDRX configuration where there is a potential shorter DRX cycle;

a Hybrid Automatic Repeat Request (HARQ) Round Trip Time (RTT) timer, which may include a HARQ RTT Timer for DL transmission, drx-HARQ-RTT-TimerDL, and a HARQ RTT Timer for UL transmission, drx-HARQ-RTT-TimerUL;

a shorter DRX cycle, drx-Short Cycle, optionally in scenarios of non-integer periodicity of cDRX configuration where there is a potential shorter DRX cycle; and a shorter DRX cycle timer, drx-ShortCycleTimer, optionally in scenarios of non-integer periodicity of cDRX configuration where there is a potential shorter DRX cycle.

According to some embodiments, in a case where two cDRX groups are configured, obtaining a DRX switching command comprises obtaining DRX switching commands per cDRX group, and switching to a second cDRX configuration comprises, switching, for each cDRX group, from a current first cDRX configuration to a second cDRX configuration.

In some embodiments, switching to a second cDRX configuration comprises, for each cDRX group:

stopping a DRX on-Duration Timer for the first cDRX configuration for the cDRX group;

stopping a DRX Inactivity Timer for the first cDRX configuration for the cDRX group; and starting a new DRX on-Duration Timer for the second cDRX configuration at an updated offset based on the second cDRX configuration for the cDRX group.

Alternatively, a DRX switching command indicates a pair of cDRX configurations for both groups. For example, the paired configurations may be named or addressed by the same indicator, and thus, when one DRX switching command indicating the indicator is received, the paired configurations can be both switched on, each for one cDRX group. Alternatively, the paired configurations may be addressed by a pair of corresponding indicators, and one DRX switching command may indicate the pair of indicators. In such embodiments, the paired cDRX configurations may share the same slot offset, DRX retransmission timer, and DRX start offset.

In further additional examples, the paired cDRX configurations of the two R16 cDRX group may share the same value of the following parameters:

a DRX slot offset, drx-SlotOffset;

a DRX retransmission timer, which may include e.g., a DRX retransmission timer for Downlink (DL) transmission drx-RetransmissionTimerDL and a DRX retransmission timer for Uplink (UL) transmission drx-Retransmission TimerUL;

a DRX cycle start offset, drx-CycleStartOffset, or optionally donated as drx-LongCycleStartOffset in scenarios of non-integer periodicity of cDRX configuration where there is a potential shorter DRX cycle;

a Hybrid Automatic Repeat Request (HARQ) Round Trip Time (RTT) timer, which may include a HARQ RTT Timer for DL transmission, drx-HARQ-RTT-TimerDL, and a HARQ RTT Timer for UL transmission, drx-HARQ-RTT-TimerUL;

a shorter DRX cycle, drx-Short Cycle, optionally in scenarios of non-integer periodicity of cDRX configuration where there is a potential shorter DRX cycle; and a shorter DRX cycle timer, drx-ShortCycleTimer, optionally in scenarios of non-integer periodicity of cDRX configuration where there is a potential shorter DRX cycle.

Figure 3:
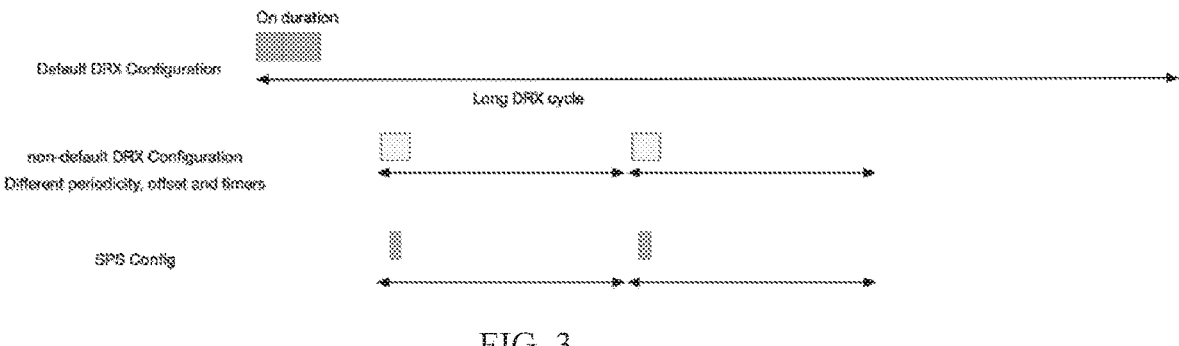
FIG. 3 illustrates an example alignment of periodicity and offset between cDRX configuration and SPS/CG configuration.

FIG. 3 illustrates an example alignment of periodicity and offset between cDRX configuration and SPS configuration.

According to some embodiments, a default cDRX configuration includes a DRX start offset drx-StartOffset which is expressed by the following equation:

$$drx\text{-}StartOffset=[(SFN\times10)+subframe\ number]modulo(drx\_cycle),$$

where SFN is a system frame number and drx_cycle is a cycle of the cDRX configuration.

Alternatively, in a scenario where a non-integer periodicity of cDRX configuration having a longer DRX cycle and a shorter DRX cycle is configured, for the longer DRX cycle, an on-Duration timer, drx-onDurationTimer, starts at an offset, drx-StartOffset, which is expressed by the following equation:

$$drx\text{-}StartOffset=[(SFN\times10)+subframe\ number]modulo(drx\text{-}LongCycle)$$

where SFN is a system frame number and drx-LongCycle is the longer DRX cycle of the of cDRX configuration, and for the shorter DRX cycle, an on-Duration timer, drx-onDurationTimer, starts after drx-SlotOffset from the beginning of the subframe, and an offset drx-StartOffset is expressed by the following equation:

$$drx\text{-}StartOffset=[(SFN\times10)+subframe\ number]modulo(drx\text{-}ShortCycle)$$

where SFN is a system frame number and drx-ShortCycle is the shorter DRX cycle of the cDRX configuration.

In contrast, for SPS configuration, after a downlink assignment is configured for SPS, the MAC entity shall consider sequentially that the Nth downlink assignment occurs in the slot for which:

(numberOfSlotsPerFrame×SFN+slot number in the frame)=[(numberOfSlotsPerFrame×SFNstarttime+slotstarttime)+N×periodicity×numberOfSlotsPerFrame/10]modulo(1024×numberOfSlotsPerFrame)

where numberOfSlotsPerFrame is a number of slots per frame,

SFN is a system frame number,

SFNstarttime is the start time of the system frame number, slotstarttime is the start time of the slot, and N is an integer.

As can be seen from FIG. 3 that the non-default cDRX configuration for XR can align drx-StartOffset and periodicity with SPS slot and periodicity. In additional or alternative embodiments, a non-default cDRX configuration can also be aligned with CG offset and periodicity that an aligned cDRX configuration involves an on duration configuration that covers the assignment timing of a CG configured XR traffic. For example, the start offset of a non-default DRX configuration can be set to a timing a little earlier than that of a corresponding SPS configuration or a corresponding CG configuration to cover the time of potential assignment, such that the assignment configured for SPS or CG can be well received.

Figure 4:
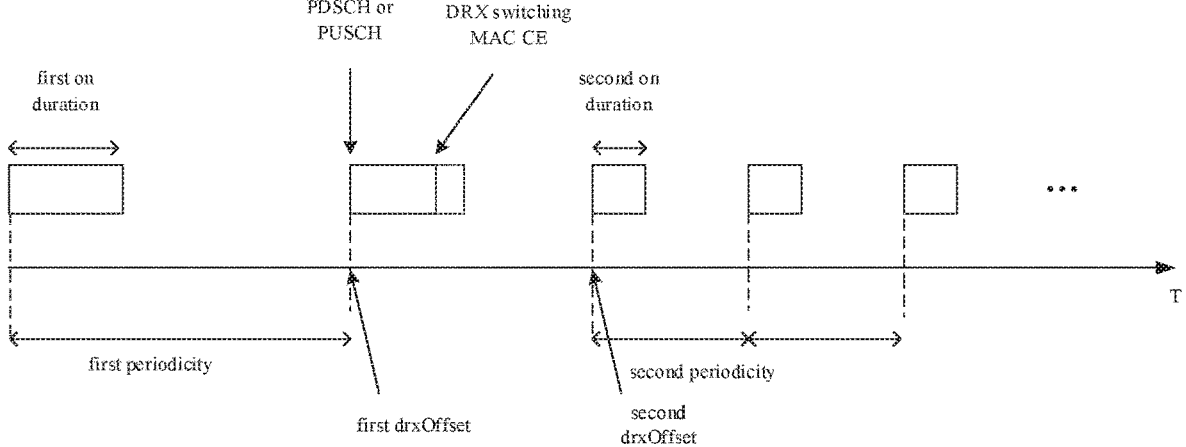
FIG. 4 illustrates an example switching process with a MAC CE functioning as the switching command.

FIG. 4 illustrates an example switching process with a MAC CE functioning as the switching command.

According to some embodiments of the present disclosure, multiple cDRX configurations and dynamic switching can be provided based on SPS/CG configuration and activation/de-activation. This is advantageous at least in that SPS activation/de-activation based on traffic is faster than cDRX configuration switching based on RRC reconfiguration message with UAI feedback. Enabling multiple cDRX configurations allows faster traffic-based switching to align SPS with cDRX configuration. For example, when SPS/CG is activated for XR traffic, a MAC CE is defined by the network to trigger cDRX switching. As a MAC CE is transmitted as part of PDSCH, UE may send an ACK/NACK back to the network to indicate whether the switching command is properly received.

According to some embodiments, switching from a first cDRX configuration to a second cDRX configuration comprises:

stopping a first DRX on-duration timer for the first cDRX configuration;

stopping a DRX inactivity timer for the first cDRX configuration; and starting a second DRX on-duration timer for the second cDRX configuration at a timing of an updated offset according to the second cDRX configuration.

It can be seen from FIG. 4 that upon receiving a DRX switching MAC CE, the first DRX on-duration timer for the first cDRX configuration and the DRX inactivity timer for the first cDRX configuration are stopped. Then, at the updated offset according to the second cDRX configuration, that is, the second drxOffset, a second DRX on-duration timer starts. The periodicity also changes, from the first periodicity, to the second periodicity to be align with an SPS configured assignment, or with a default DRX configuration.

According to some embodiments, an offset, e.g., the updated according to a non-default cDRX configuration as described above, is based on a slot number of a downlink assignment configured for SPS, and a slot number for an Nth downlink assignment is expressed by the following equation:

(numberOfSlotsPerFrame×SFN+slot number in the frame)=[(numberOfSlotsPerFrame×SFNstarttime+slotstarttime)+N×periodicity×numberOfSlotsPerFrame/10]modulo(1024×numberOfSlotsPerFrame), where numberOfSlotsPerFrame is a number of slots per frame, SFN is a system frame number, SFNstarttime is the start time of the system frame number, slotstarttime is the start time of the slot, and N is an integer.

Although in FIG. 4, a process from a configuration with a larger periodicity to another configuration with a smaller periodicity is illustrated, those skilled in the art will understand that this is merely a non-limiting example. For example, a MAC CE can be used to trigger cDRX switching back to a default cDRX when SPS/CG is de-activated for XR traffic.

It can be easily understood that, in the case where two cDRX groups are configured, upon receiving the DRX switching command MAC CE, the method may include stopping drx-onDurationTimer for the current cDRX configuration for each cDRX group, stopping drx-Inactivity Timer for the current cDRX configuration for each cDRX group, and starting, for each of the two groups, a drx-onDuration Timer for the new cDRX configuration for the group at the offset.

In one embodiment, DRX switching command MAC CE is per DRX group. To keep the same principle of two DRX groups, the periodicity and offset of the new cDRX configuration may be aligned between the two cDRX groups.

In one alternative embodiment, one DL MAC CE can indicate to switch to a paired cDRX configurations in both cDRX groups.

According to some embodiments, the DRX switching command is a MAC CE with a fixed size. For example, the DRX switching command is a MAC CE with 1-byte to indicate which configuration is the second configuration that shall be activated at this time. In other embodiments, e.g., in a case where there is one default configuration and one non-default configuration, the DRX switching command may be a MAC CE with a size being zero, and switching from the first cDRX configuration to the second cDRX configuration may include toggling the status of cDRX configuration upon receiving the command.

Figure 5:
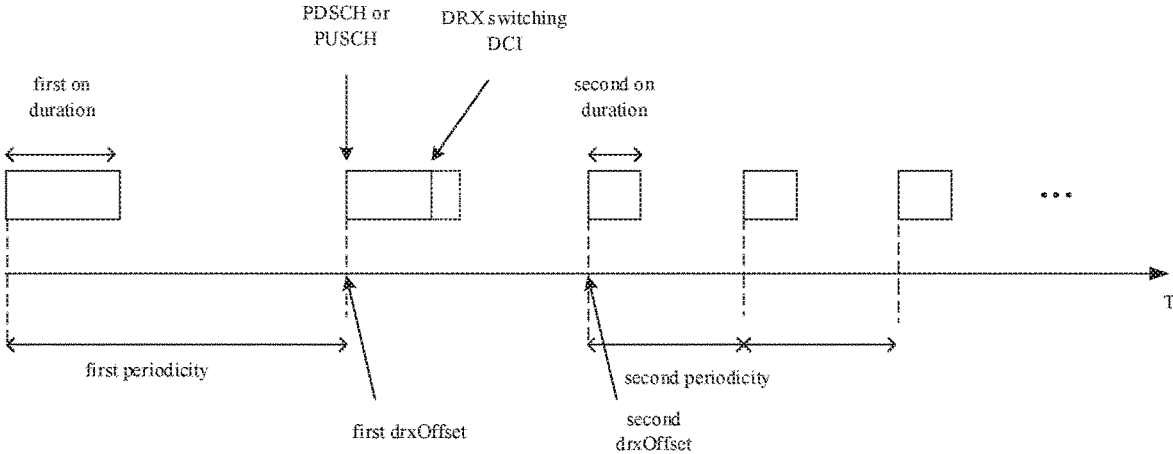
FIG. 5 illustrates an example switching process with DCI functioning as the switching command.

FIG. 5 illustrates an example switching process with DCI functioning as the switching command. The DCI may be a non-scheduling DCI or a scheduling-based Downlink Control Information (DCI). The DCI may indicate a number or indicator of the second cDRX configuration.

Behavior with non-scheduling DCI as switching command may be similar to those discussed above with MAC CE. Upon reception of a non-scheduling DCI, an ACK/NACK according to HARQ-ACK codebook generation procedure may be sent. Details of transmitting a non-scheduling DCI by, e.g., a network device, will further be described below.

As can be seen from FIG. 5, when the DRX switching DCI is received: the method may include stopping drx-onDurationTimer for the current cDRX configuration for each cDRX group; stopping drx-Inactivity Timer for the current cDRX configuration for each cDRX group; and starting drx-onDurationTimer for the new cDRX configuration at the offset.

It can be seen from FIG. 5 that upon receiving a DRX switching DCI, the first DRX on-duration timer for the first cDRX configuration and the DRX inactivity timer for the first cDRX configuration are stopped. Then, at the updated offset according to the second cDRX configuration, that is, the second drxOffset, a second DRX on-duration timer starts. The periodicity also changes, from the first periodicity, to the second periodicity to be align with an SPS configured assignment, or with a default DRX configuration. It can also be easily understood that, in the case where two cDRX groups are configured, upon receiving the DRX switching command DCI, the method may include stopping drx-onDurationTimer for the current cDRX configuration for each cDRX group, stopping drx-Inactivity Timer for the current cDRX configuration for each cDRX group, and starting, for each of the two groups, a drx-onDurationTimer for the new cDRX configuration for the group at the offset. In some embodiments, DRX switching command DCI is per DRX group. To keep the same principle of two DRX groups, the periodicity and offset of the new cDRX configuration may be aligned between the two cDRX groups. In one alternative embodiment, one DL DCI can indicate to switch to a paired cDRX configurations in both cDRX groups.

According to other embodiments, switching, based on a scheduling-based Downlink Control Information DCI as the DRX switching command may comprise starting a DRX on-Duration Timer for the second cDRX configuration at a timing of an updated offset according to the second cDRX configuration.

As already discussed above, per cDRX configuration, different HARQ timers can be configured. In particular, for non-default cDRX configuration that can be activated together with XR traffic, and based on gNB capability, smaller RTT DL and UL timer and smaller retransmission timer can be configured. In some embodiments, non-default cDRX configuration may be applied to all HARQ processes including Dynamic Grant (DG).

In a case where multiple SPS processes are activated at the same time, the cDRX configuration indicated in the switching command may be one matching one or more SPS processes. In that case, SPS transmission in OFF duration of the cDRX configuration follow the same HARQ timers of the current activated cDRX configuration.

FIG. 6 illustrates a flowchart for an exemplary method for a network device in accordance with some embodiments. The method 600 illustrated in FIG. 6 may be implemented by the base station 150 described in FIG. 1. For example, the network device may be the network device of the base station 150.

In some embodiments, the method 600 for a network device may include the following steps: S602, monitoring an activation or deactivation of an Semi-Persistent Scheduling (SPS) or Configured Grant (CG) configuration; and S604, transmitting, based on the activation or deactivation of the SPS or CG configuration, a Discontinuous Reception (DRX) switching command to a user equipment (UE) for the UE to switch from a current first Connected Mode DRX (cDRX) configuration to a different second cDRX configuration, where each of the first cDRX configuration and the second cDRX configuration is a configuration selected from a group consisting of: a default cDRX configuration; and at least one non-default cDRX configuration, where each non-default cDRX configuration of the at least one non-default cDRX configuration comprises a cDRX periodicity and a cDRX offset corresponding to a periodicity and an offset of the SPS or CG configuration, respectively.

In the following, each step of the method 600 will be described in detail.

At step S602, monitoring an activation or deactivation of a Semi-Persistent Scheduling (SPS) or Configured Grant (CG) configuration.

At step S604, transmitting, based on the activation or deactivation of the SPS or CG configuration, a Discontinuous Reception (DRX) switching command to a user equipment (UE) for the UE to switch from a current first Connected Mode DRX (cDRX) configuration to a different second cDRX configuration, where each of the first cDRX configuration and the second cDRX configuration is a configuration selected from a group consisting of:

a default cDRX configuration; and at least one non-default cDRX configuration, wherein each non-default cDRX configuration of the at least one non-default cDRX configuration comprises a cDRX periodicity and a cDRX offset corresponding to a periodicity and an offset of the SPS or CG configuration, respectively.

In some embodiments, transmitting a DRX switching command comprises: in response to determining an SPS or CG activation for an XR traffic, transmitting a DRX switching command indicating a non-default cDRX configuration corresponding to the activated SPS or CG configuration for the XR traffic. As already discussed above, in some embodiments, a network may use MAC CE to trigger cDRX switching when SPS/CG is activated for XR traffic by defining a new DL MAC CE to indicate cDRX configuration switching, and in other embodiments, a network may use DCI to trigger cDRX switching when SPS/CG is activated for XR traffic.

In some embodiments, transmitting a DRX switching command comprises: in response to determining an SPS or CG deactivation for an XR traffic, transmitting a DRX switching command indicating a default cDRX configuration. As already discussed above, in some embodiments, a network may use a MAC CE to trigger cDRX switching back to a default cDRX when SPS/CG is de-activated for XR traffic by defining a new DL MAC CE to indicate cDRX configuration switching, and in other embodiments, a network may use a DCI to trigger cDRX switching back to a default cDRX when SPS/CG is de-activated for XR traffic.

In some embodiments, transmitting a DRX switching command comprises defining a new downlink (DL) MAC CE indicating the second cDRX configuration and transmitting the MAC CE to the UE.

In some embodiments, transmitting a DRX switching command comprises configuring or reconfiguring a Downlink Control Information (DCI) indicating the second cDRX configuration and transmitting the DCI to the UE. The DCI may be a non-scheduling DCI or a scheduling-based DCI. The DCI may indicate a number or an identifier of the new cDRX configuration to be activated.

In some embodiments, after the operation of transmitting a switching command, the method may further include waiting for an ACK to the switching command, and if it fails, resending a switching command indicating the second cDRX configuration to the UE to avoid mismatch of DRX configuration between gNB and UE.

It can be easily understood by those skilled in the art that as a MAC CE is transmitted as part of PDSCH, in cases where a MAC CE is used as a switching command, the network may naturally use the ACK/NACK of PDSCH transmission as the ACK/NACK of the cDRX switching command. In embodiments where a non-scheduling DCI is used as a switching command, the network may resend the non-scheduling DCI if a corresponding NACK is received to avoid mismatch of DRX configuration at gNB and UE. The non-scheduling DCI can be designed similar to SPS/CG type 2 de-activation/release DCI, which was specified in 38.213. For example, the non-scheduling DCI functioning as a cDRX switching command may be generated by using similar validation field design as the SPS/CG type 2 de-activation/release DCI, and therefore, HARQ-ACK codebook generation procedure may be reused to generate ACK/NACK to the switching command. Upon reception of a NACK, the network may resend a switching command, e.g., another non-scheduling DCI, to avoid mismatch of DRX configuration. In other additional or alternative embodiments where a scheduling DCI is used as a switching command, for a DL scheduling DCI, the network may regard an ACK to the scheduled PDSCH as an implicit ACK to the switching DCI, and for a UL scheduling DCI, the network may regard a PUSCH transmission as an implicit ACK of proper reception of the switching DCI. In the other hand, in case of lacking proper ACK response, the network may resend a switching command, e.g., another scheduling based DCI, to the UE.

In some embodiments, in a case where two cDRX groups are configured, transmitting a DRX switching command comprises: for each DRX group of the two cDRX groups, transmitting a DRX switching command indicating a second cDRX configuration for the DRX group. In some alternative embodiments, in a case where two cDRX groups are configured, transmitting a DRX switching command comprises transmitting a DRX switching command indicating a pair of cDRX configurations for both groups. In that case, one DL DCI can switch the paired cDRX configurations in both cDRX groups.

In a case where multiple SPS processes are activated at the same time, the method may include activating one cDRX configuration matching one or more SPS processes. The network may select the proper one cDRX configuration to activate. In that case, SPS transmission in OFF duration of the cDRX configuration follow the same HARQ timers of the current activated cDRX configuration.

Figure 7:
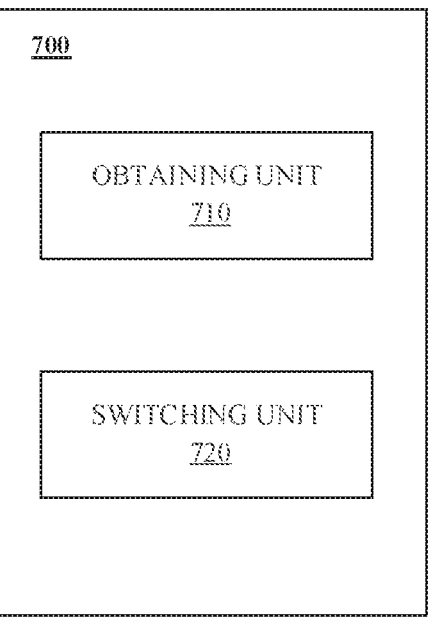
FIG. 7 illustrates an exemplary block diagram of an apparatus for a UE in accordance with some embodiments.

FIG. 7 illustrates an exemplary block diagram of an apparatus for a user equipment (UE) in accordance with some embodiments. The apparatus 700 illustrated in FIG. 7 may be used to implement the method 200 as illustrated in combination with FIG. 2.

As illustrated in FIG. 7, the apparatus 700 includes an obtaining unit 710 and a switching unit 720.

The obtaining unit 710 may be configured to obtain a Discontinuous Reception (DRX) switching command from a network device.

The switching unit 720 may be configured to switch, based on the DRX switching command, from a current first Connected Mode DRX (cDRX) configuration to a different second cDRX configuration, where each of the first cDRX configuration and the second cDRX configuration is a configuration selected from a group consisting of: a default cDRX configuration; and at least one non-default cDRX configuration, where each non-default cDRX configuration of the at least one non-default cDRX configuration comprises a cDRX periodicity and a cDRX offset corresponding to a periodicity and an offset of a Semi-Persistent Scheduling (SPS) or Configured Grant (CG) configuration, respectively.

According to the embodiments of the present application, the wake-up and sleep pattern of UE can be switched to align with the SPS or CG configuration to facilitate UE power saving.

Figure 8:
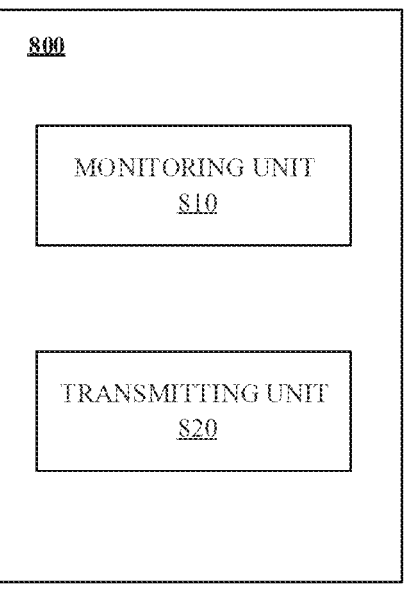
FIG. 8 illustrates an exemplary block diagram of an apparatus for a network device in accordance with some embodiments.

FIG. 8 illustrates an exemplary block diagram of an apparatus for a network in accordance with some embodiments. The apparatus 800 illustrated in FIG. 8 may be used to implement the method 600 as illustrated in combination with FIG. 6.

As illustrated in FIG. 8, the apparatus 800 includes the monitoring unit 810 and the transmitting unit 820.

The monitoring unit 810 may be configured to monitor an activation or deactivation of a Semi-Persistent Scheduling (SPS) or Configured Grant (CG) configuration.

The transmitting unit 820 may be configured to transmit, based on the activation or deactivation of the SPS or CG configuration, a Discontinuous Reception (DRX) switching command to a user equipment (UE) for the UE to switch from a current first Connected Mode DRX (cDRX) configuration to a different second cDRX configuration, where each of the first cDRX configuration and the second cDRX configuration is a configuration selected from a group consisting of: a default cDRX configuration; and at least one non-default cDRX configuration, where each non-default cDRX configuration of the at least one non-default cDRX configuration comprises a cDRX periodicity and a cDRX offset corresponding to a periodicity and an offset of the SPS or CG configuration, respectively.

According to some embodiments of the present disclosure, the wake-up and sleep pattern of UE can be switched to align with the SPS or CG configuration to facilitate UE power saving.

In some embodiments, also provided is an apparatus for a user equipment (UE), the apparatus comprising: one or more processors configured to perform steps of any of the methods for UE according to various embodiments of the disclosure. In some embodiments, also provided is an apparatus of a network device, the apparatus comprising: one or more processors configured to perform steps of any of the methods for network device according to various embodiments of the disclosure. In some embodiments, also provided is a computer readable medium having computer programs stored thereon which, when executed by one or more processors, cause an apparatus to perform steps of any of the methods according to various embodiments of the disclosure. In some embodiments, also provided is an apparatus for a communication device, comprising means for performing steps of any of the methods according to various embodiments of the disclosure. In some embodiments, also provided is a computer program product comprising computer programs which, when executed by one or more processors, cause an apparatus to perform steps of any of the methods according to various embodiments of the disclosure.

Figure 9:
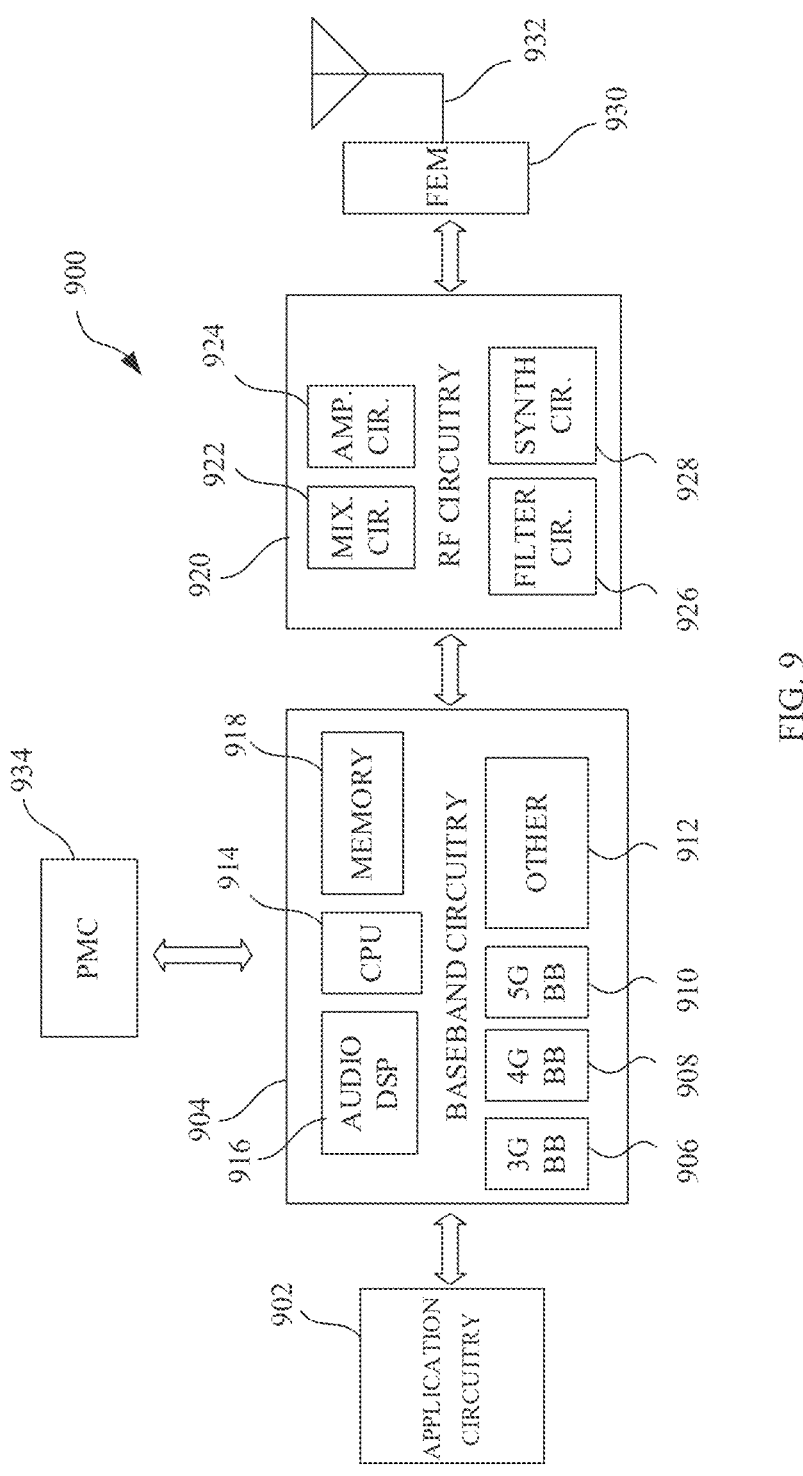
FIG. 9 illustrates example components of a device in accordance with some embodiments.

FIG. 9 illustrates example components of a device 900 in accordance with some embodiments. In some embodiments, the device 900 may include application circuitry 902, baseband circuitry 904, Radio Frequency (RF) circuitry (shown as RF circuitry 920), front-end module (FEM) circuitry (shown as FEM circuitry 930), one or more antennas 932, and power management circuitry (PMC) (shown as PMC 934) coupled together at least as shown. The components of the illustrated device 900 may be included in a UE or a RAN node. In some embodiments, the device 900 may include fewer elements (e.g., a RAN node may not utilize application circuitry 902, and instead include a processor/controller to process IP data received from an EPC). In some embodiments, the device 900 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 902 may include one or more application processors. For example, the application circuitry 902 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 900. In some embodiments, processors of application circuitry 902 may process IP data packets received from an EPC.

The baseband circuitry 904 may include circuitry such as, but not limited to, one or more single-core or multi-core processors. The baseband circuitry 904 may include one or more baseband processors or control logic to process baseband signals received from a receive signal path of the RF circuitry 920 and to generate baseband signals for a transmit signal path of the RF circuitry 920. The baseband circuitry 904 may interface with the application circuitry 902 for generation and processing of the baseband signals and for controlling operations of the RF circuitry 920. For example, in some embodiments, the baseband circuitry 904 may include a third generation (3G) baseband processor (3G baseband processor 906), a fourth generation (4G) baseband processor (4G baseband processor 908), a fifth generation (5G) baseband processor (5G baseband processor 910), or other baseband processor(s) 912 for other existing generations, generations in development or to be developed in the future (e.g., second generation (2G), sixth generation (6G), etc.). The baseband circuitry 904 (e.g., one or more of baseband processors) may handle various radio control functions that enable communication with one or more radio networks via the RF circuitry 920. In other embodiments, some or all of the functionality of the illustrated baseband processors may be included in modules stored in the memory 918 and executed via a Central Processing ETnit (CPET 914). The radio control functions may include, but are not limited to, signal modulation/demodulation, encoding/decoding, radio frequency shifting, etc. In some embodiments, modulation/demodulation circuitry of the baseband circuitry 904 may include Fast-Fourier Transform (FFT), precoding, or constellation mapping/demapping functionality. In some embodiments, encoding/decoding circuitry of the baseband circuitry 904 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 904 may include a digital signal processor (DSP), such as one or more audio DSP(s) 916. The one or more audio DSP(s) 916 may include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 904 and the application circuitry 902 may be implemented together such as, for example, on a system on a chip (SOC).

In some embodiments, the baseband circuitry 904 may provide for communication compatible with one or more radio technologies. For example, in some embodiments, the baseband circuitry 904 may support communication with an evolved universal terrestrial radio access network (EU-TRAN) or other wireless metropolitan area networks (WMAN), a wireless local area network (WLAN), or a wireless personal area network (WPAN). Embodiments in which the baseband circuitry 904 is configured to support radio communications of more than one wireless protocol may be referred to as multi-mode baseband circuitry.

The RF circuitry 920 may enable communication with wireless networks using modulated electromagnetic radiation through a non-solid medium. In various embodiments, the RF circuitry 920 may include switches, filters, amplifiers, etc. to facilitate the communication with the wireless network. The RF circuitry 920 may include a receive signal path which may include circuitry to down-convert RF signals received from the FEM circuitry 930 and provide baseband signals to the baseband circuitry 904. The RF circuitry 920 may also include a transmit signal path which may include circuitry to up-convert baseband signals provided by the baseband circuitry 904 and provide RF output signals to the FEM circuitry 930 for transmission.

In some embodiments, the receive signal path of the RF circuitry 920 may include mixer circuitry 922, amplifier circuitry 924 and filter circuitry 926. In some embodiments, the transmit signal path of the RF circuitry 920 may include filter circuitry 926 and mixer circuitry 922. The RF circuitry 920 may also include synthesizer circuitry 928 for synthesizing a frequency for use by the mixer circuitry 922 of the receive signal path and the transmit signal path. In some embodiments, the mixer circuitry 922 of the receive signal path may be configured to down-convert RF signals received from the FEM circuitry 930 based on the synthesized frequency provided by synthesizer circuitry 928. The amplifier circuitry 924 may be configured to amplify the down-converted signals and the filter circuitry 926 may be a low-pass filter (LPF) or band-pass filter (BPF) configured to remove unwanted signals from the down-converted signals to generate output baseband signals. Output baseband signals may be provided to the baseband circuitry 904 for further processing. In some embodiments, the output baseband signals may be zero-frequency baseband signals, although this is not a requirement. In some embodiments, the mixer circuitry 922 of the receive signal path may include passive mixers, although the scope of the embodiments is not limited in this respect.

In some embodiments, the mixer circuitry 922 of the transmit signal path may be configured to up-convert input baseband signals based on the synthesized frequency provided by the synthesizer circuitry 928 to generate RF output signals for the FEM circuitry 930. The baseband signals may be provided by the baseband circuitry 904 and may be filtered by the filter circuitry 926.

In some embodiments, the mixer circuitry 922 of the receive signal path and the mixer circuitry 922 of the transmit signal path may include two or more mixers and may be arranged for quadrature downconversion and upconversion, respectively. In some embodiments, the mixer circuitry 922 of the receive signal path and the mixer circuitry 922 of the transmit signal path may include two or more mixers and may be arranged for image rejection (e.g., Hartley image rejection). In some embodiments, the mixer circuitry 922 of the receive signal path and the mixer circuitry 922 may be arranged for direct downconversion and direct upconversion, respectively. In some embodiments, the mixer circuitry 922 of the receive signal path and the mixer circuitry 922 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 920 may include analog-to-digital converter (ADC) and digital-to-analog converter (DAC) circuitry and the baseband circuitry 904 may include a digital baseband interface to communicate with the RF circuitry 920.

In some dual-mode embodiments, a separate radio IC circuitry may be provided for processing signals for each spectrum, although the scope of the embodiments is not limited in this respect.

In some embodiments, the synthesizer circuitry 928 may be a fractional –N synthesizer or a fractional N/N+1 synthesizer, although the scope of the embodiments is not limited in this respect as other types of frequency synthesizers may be suitable. For example, synthesizer circuitry 928 may be a delta-sigma synthesizer, a frequency multiplier, or a synthesizer including a phase-locked loop with a frequency divider.

The synthesizer circuitry 928 may be configured to synthesize an output frequency for use by the mixer circuitry 922 of the RF circuitry 920 based on a frequency input and a divider control input. In some embodiments, the synthesizer circuitry 928 may be a fractional N/N+1 synthesizer.

In some embodiments, frequency input may be provided by a voltage controlled oscillator (VCO), although that is not a requirement. Divider control input may be provided by either the baseband circuitry 904 or the application circuitry 902 (such as an applications processor) depending on the desired output frequency. In some embodiments, a divider control input (e.g., N) may be determined from a look-up table based on a channel indicated by the application circuitry 902.

Synthesizer circuitry 928 of the RF circuitry 920 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 928 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 920 may include an IQ/polar converter.

The FEM circuitry 930 may include a receive signal path which may include circuitry configured to operate on RF signals received from one or more antennas 932, amplify the received signals and provide the amplified versions of the received signals to the RF circuitry 920 for further processing. The FEM circuitry 930 may also include a transmit signal path which may include circuitry configured to amplify signals for transmission provided by the RF circuitry 920 for transmission by one or more of the one or more antennas 932. In various embodiments, the amplification through the transmit or receive signal paths may be done solely in the RF circuitry 920, solely in the FEM circuitry 930, or in both the RF circuitry 920 and the FEM circuitry 930.

In some embodiments, the FEM circuitry 930 may include a TX/RX switch to switch between transmit mode and receive mode operation. The FEM circuitry 930 may include a receive signal path and a transmit signal path. The receive signal path of the FEM circuitry 930 may include an LNA to amplify received RF signals and provide the amplified received RF signals as an output (e.g., to the RF circuitry 920). The transmit signal path of the FEM circuitry 930 may include a power amplifier (PA) to amplify input RF signals (e.g., provided by the RF circuitry 920), and one or more filters to generate RF signals for subsequent transmission (e.g., by one or more of the one or more antennas 932).

In some embodiments, the PMC 934 may manage power provided to the baseband circuitry 904. In particular, the PMC 934 may control power-source selection, voltage scaling, battery charging, or DC-to-DC conversion. The PMC 934 may often be included when the device 900 is capable of being powered by a battery, for example, when the device 900 is included in an UE. The PMC 934 may increase the power conversion efficiency while providing desirable implementation size and heat dissipation characteristics.

FIG. 9 shows the PMC 934 coupled only with the baseband circuitry 904. However, in other embodiments, the PMC 934 may be additionally or alternatively coupled with, and perform similar power management operations for, other components such as, but not limited to, the application circuitry 902, the RF circuitry 920, or the FEM circuitry 930.

In some embodiments, the PMC 934 may control, or otherwise be part of, various power saving mechanisms of the device 900. For example, if the device 900 is in an RRC Connected state, where it is still connected to the RAN node as it expects to receive traffic shortly, then it may enter a state known as Discontinuous Reception Mode (DRX) after a period of inactivity. During this state, the device 900 may power down for brief intervals of time and thus save power.

If there is no data traffic activity for an extended period of time, then the device 900 may transition off to an RRC Idle state, where it disconnects from the network and does not perform operations such as channel quality feedback, handover, etc. The device 900 goes into a very low power state and it performs paging where again it periodically wakes up to listen to the network and then powers down again. The device 900 may not receive data in this state, and in order to receive data, it transitions back to an RRC Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 902 and processors of the baseband circuitry 904 may be used to execute elements of one or more instances of a protocol stack. For example, processors of the baseband circuitry 904, alone or in combination, may be used to execute Layer 3, Layer 2, or Layer 1 functionality, while processors of the application circuitry 902 may utilize data (e.g., packet data) received from these layers and further execute Layer 4 functionality (e.g., transmission communication protocol (TCP) and user datagram protocol (UDP) layers). As referred to herein, Layer 3 may include a radio resource control (RRC) layer, described in further detail below. As referred to herein, Layer 2 may include a medium access control (MAC) layer, a radio link control (RLC) layer, and a packet data convergence protocol (PDCP) layer, described in further detail below. As referred to herein, Layer 1 may include a physical (PHY) layer of a UE/RAN node, described in further detail below.

Figure 10:
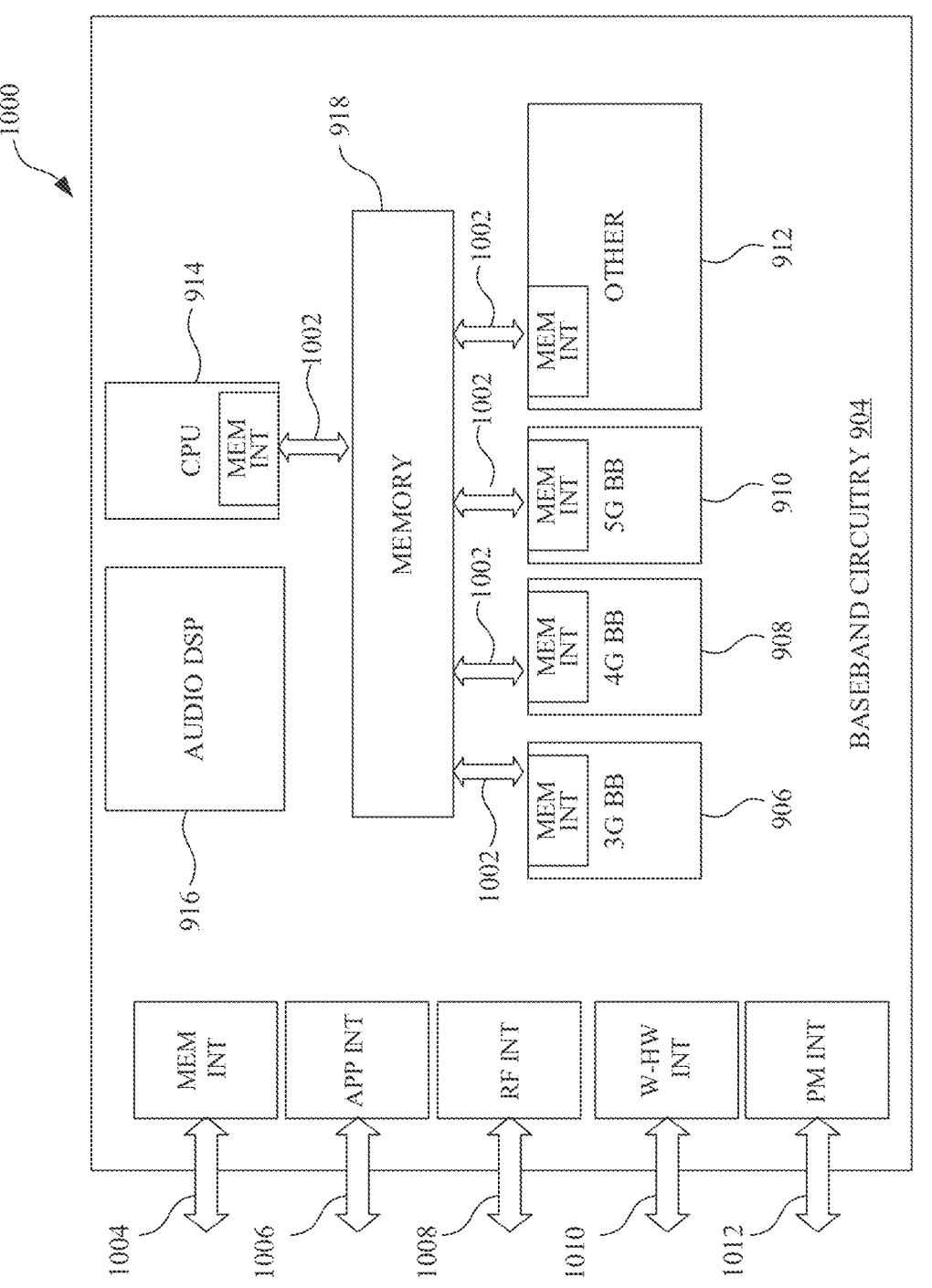
FIG. 10 illustrates example interfaces of baseband circuitry in accordance with some embodiments.

FIG. 10 illustrates example interfaces 1000 of baseband circuitry in accordance with some embodiments. As discussed above, the baseband circuitry 904 of FIG. 10 may include 3G baseband processor 1006, 4G baseband processor 1008, 5G baseband processor 1010, other baseband processor(s) 1012, CPU 1014, and a memory 1018 utilized by said processors. As illustrated, each of the processors may include a respective memory interface 1002 to send/receive data to/from the memory 1018.

The baseband circuitry 904 may further include one or more interfaces to communicatively couple to other circuitries/devices, such as a memory interface 1004 (e.g., an interface to send/receive data to/from memory external to the baseband circuitry 904), an application circuitry interface 1006 (e.g., an interface to send/receive data to/from the application circuitry 902 of FIG. 9), an RF circuitry interface 1008 (e.g., an interface to send/receive data to/from RF circuitry 920 of FIG. 109), a wireless hardware connectivity interface 1010 (e.g., an interface to send/receive data to/from Near Field Communication (NFC) components, Bluetooth® components (e.g., Bluetooth® Low Energy), Wi-Fi® components, and other communication components), and a power management interface 1012 (e.g., an interface to send/receive power or control signals to/from the PMC 4934.

Figure 11:
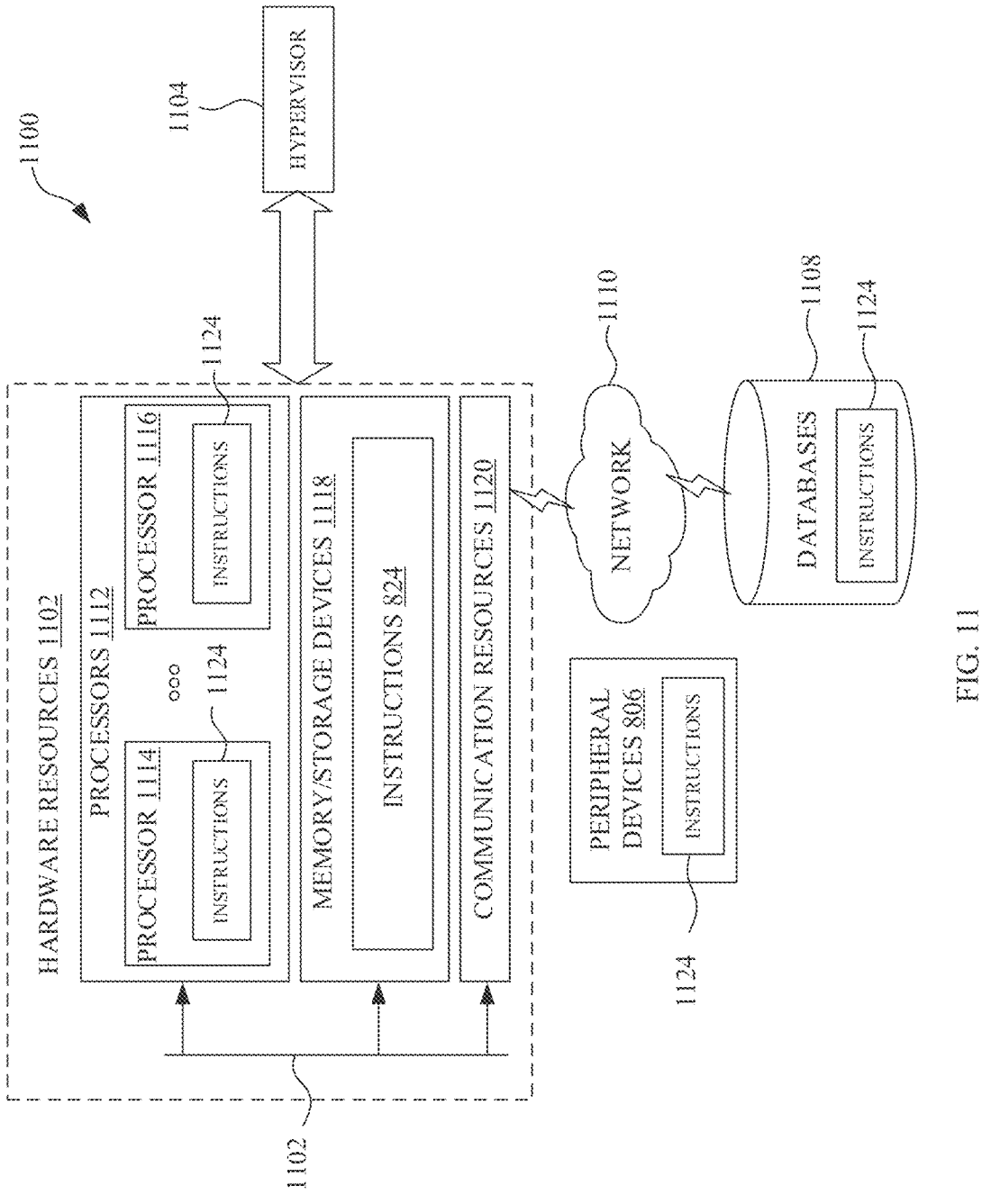
FIG. 11 illustrates components in accordance with some embodiments.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1112 (or processor cores), one or more memory/storage devices 1118, and one or more communication resources 1120, each of which may be communicatively coupled via a bus 1122. For embodiments where node virtualization (e.g., NFV) is utilized, a hypervisor 1104 may be executed to provide an execution environment for one or more network slices/sub-slices to utilize the hardware resources 1102.

The processors 1112 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1114 and a processor 1116.

The memory/storage devices 1118 may include main memory, disk storage, or any suitable combination thereof.

The memory/storage devices 1118 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1120 may include interconnection or network interface components or other suitable devices to communicate with one or more peripheral devices 1106 or one or more databases 1108 via a network 1110. For example, the communication resources 1120 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1124 may include software, a program, an application, an applet, an app, or other executable code for causing at least any of the processors 1112 to perform any one or more of the methodologies discussed herein. The instructions 1124 may reside, completely or partially, within at least one of the processors 1112 (e.g., within the processor's cache memory), the memory/storage devices 1118, or any suitable combination thereof. Furthermore, any portion of the instructions 1124 may be transferred to the hardware resources 1102 from any combination of the peripheral devices 1106 or the databases 1108. Accordingly, the memory of the processors 1112, the memory/storage devices 1118, the peripheral devices 1106, and the databases 1108 are examples of computer-readable and machine-readable media.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

Figure 12:
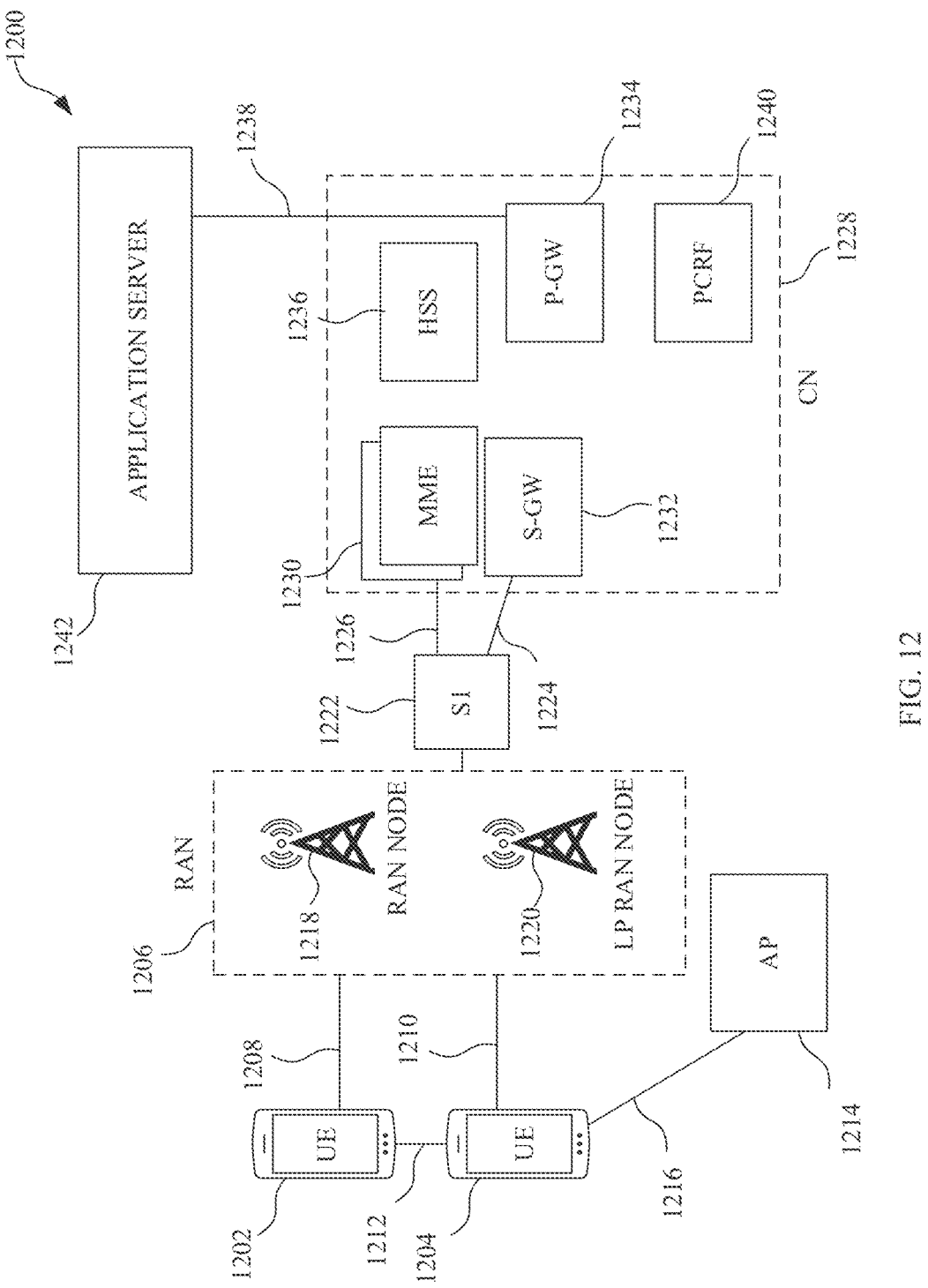
FIG. 12 illustrates an architecture of a wireless network in accordance with some embodiments.

FIG. 12 illustrates an architecture of a system 1200 of a network in accordance with some embodiments. The system 1200 includes one or more user equipment (UE), shown in this example as a UE 1202 and a UE 1204. The UE 1202 and the UE 1204 are illustrated as smartphones (e.g., handheld touchscreen mobile computing devices connectable to one or more cellular networks), but may also include any mobile or non-mobile computing device, such as Personal Data Assistants (PDAs), pagers, laptop computers, desktop computers, wireless handsets, or any computing device including a wireless communications interface.

In some embodiments, any of the UE 1202 and the UE 1204 can include an Internet of Things (IoT) UE, which can include a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1202 and the UE 1204 may be configured to connect, e.g., communicatively couple, with a radio access network (RAN), shown as RAN 1206. The RAN 1206 may be, for example, an Evolved ETniversal Mobile Telecommunications System (ETMTS) Terrestrial Radio Access Network (E-UTRAN), a NextGen RAN (NG RAN), or some other type of RAN. The UE 1202 and the UE 1204 utilize connection 1208 and connection 1210, respectively, each of which includes a physical communications interface or layer (discussed in further detail below); in this example, the connection 1208 and the connection 1210 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1202 and the UE 1204 may further directly exchange communication data via a ProSe interface 1212. The ProSe interface 1212 may alternatively be referred to as a sidelink interface including one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1204 is shown to be configured to access an access point (AP), shown as AP 1214, via connection 1216. The connection 1216 can include a local wireless connection, such as a connection consistent with any IEEE 802.11 protocol, wherein the AP 1214 would include a wireless fidelity (WiFi®) router. In this example, the AP 1214 may be connected to the Internet without connecting to the core network of the wireless system (described in further detail below).

The RAN 1206 can include one or more access nodes that enable the connection 1208 and the connection 1210. These access nodes (ANs) can be referred to as base stations (BSs), NodeBs, evolved NodeBs (eNBs), next Generation NodeBs (gNB), RAN nodes, and so forth, and can include ground stations (e.g., terrestrial access points) or satellite stations providing coverage within a geographic area (e.g., a cell). The RAN 1206 may include one or more RAN nodes for providing macrocells, e.g., macro RAN node 1218, and one or more RAN nodes for providing femtocells or picocells (e.g., cells having smaller coverage areas, smaller user capacity, or higher bandwidth compared to macrocells), e.g., a low power (LP) RAN node such as LP RAN node 1220.

Any of the macro RAN node 1218 and the LP RAN node 1220 can terminate the air interface protocol and can be the first point of contact for the UE 1202 and the UE 1204. In some embodiments, any of the macro RAN node 1218 and the LP RAN node 1220 can fulfill various logical functions for the RAN 1206 including, but not limited to, radio network controller (RNC) functions such as radio bearer management, uplink and downlink dynamic radio resource management and data packet scheduling, and mobility management.

In accordance with some embodiments, the EGE 1202 and the UE 1204 can be configured to communicate using Orthogonal Frequency-Division Multiplexing (OFDM) communication signals with each other or with any of the macro RAN node 1218 and the LP RAN node 1220 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can include a plurality of orthogonal sub carriers.

In some embodiments, a downlink resource grid can be used for downlink transmissions from any of the macro RAN node 1218 and the LP RAN node 1220 to the UE 1202 and the UE 1204, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid includes a number of resource blocks, which describe the mapping of certain physical channels to resource elements. Each resource block includes a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1202 and the UE 1204. The physical downlink control channel (PDCCH) may carry information about the transport format and resource allocations related to the PDSCH channel, among other things. It may also inform the UE 1202 and the UE 1204 about the transport format, resource allocation, and H-ARQ (Hybrid Automatic Repeat Request) information related to the uplink shared channel. Typically, downlink scheduling (assigning control and shared channel resource blocks to the UE 1204 within a cell) may be performed at any of the macro RAN node 1218 and the LP RAN node 1220 based on channel quality information fed back from any of the UE 1202 and UE 1204. The downlink resource assignment information may be sent on the PDCCH used for (e.g., assigned to) each of the UE 1202 and the UE 1204.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1206 is communicatively coupled to a core network (CN), shown as CN 1228—via an S1 interface 1222. In embodiments, the CN 1228 may be an evolved packet core (EPC) network, a NextGen Packet Core (NPC) network, or some other type of CN. In this embodiment the S1 interface 1222 is split into two parts: the S1-U interface 1224, which carries traffic data between the macro RAN node 1218 and the LP RAN node 1220 and a serving gateway (S-GW), shown as S-GW 1132, and an S1-mobility management entity (MME) interface, shown as S1-MME interface 1226, which is a signaling interface between the macro RAN node 1218 and LP RAN node 1220 and the MME(s) 1230.

In this embodiment, the CN 1228 includes the MME(s) 1230, the S-GW 1232, a Packet Data Network (PDN) Gateway (P-GW) (shown as P-GW 1234), and a home subscriber server (HSS) (shown as HSS 1236). The MME(s) 1230 may be similar in function to the control plane of legacy Serving General Packet Radio Service (GPRS) Support Nodes (SGSN). The MME(s) 1230 may manage mobility aspects in access such as gateway selection and tracking area list management. The HSS 1236 may include a database for network users, including subscription-related information to support the network entities' handling of communication sessions. The CN 1228 may include one or several HSS 1236, depending on the number of mobile subscribers, on the capacity of the equipment, on the organization of the network, etc. For example, the HSS 1236 can provide support for routing/roaming, authentication, authorization, naming/addressing resolution, location dependencies, etc.

The S-GW 1232 may terminate the S1 interface 1222 towards the RAN 1206, and routes data packets between the RAN 1206 and the CN 1228. In addition, the S-GW 1232 may be a local mobility anchor point for inter-RAN node handovers and also may provide an anchor for inter-3 GPP mobility. Other responsibilities may include lawful intercept, charging, and some policy enforcement.

The P-GW 1234 may terminate an SGi interface toward a PDN. The P-GW 1234 may route data packets between the CN 1228 (e.g., an EPC network) and external networks such as a network including the application server 1242 (alternatively referred to as application function (AF)) via an Internet Protocol (IP) interface (shown as IP communications interface 1238). Generally, an application server 1242 may be an element offering applications that use IP bearer resources with the core network (e.g., ETMTS Packet Services (PS) domain, LTE PS data services, etc.). In this embodiment, the P-GW 1234 is shown to be communicatively coupled to an application server 1242 via an IP communications interface 1238. The application server 1242 can also be configured to support one or more communication services (e.g., Voice-over-Internet Protocol (VOIP) sessions, PTT sessions, group communication sessions, social networking services, etc.) for the UE 1202 and the UE 1204 via the CN 1228.

The P-GW 1234 may further be a node for policy enforcement and charging data collection. A Policy and Charging Enforcement Function (PCRF) (shown as PCRF 1240) is the policy and charging control element of the CN 1228. In a non-roaming scenario, there may be a single PCRF in the Home Public Land Mobile Network (HPLMN) associated with a ETE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1240 may be communicatively coupled to the application server 1242 via the P-GW 1234. The application server 1242 may signal the PCRF 1240 to indicate a new service flow and select the appropriate Quality of Service (QOS) and charging parameters. The PCRF 1240 may provision this rule into a Policy and Charging Enforcement Function (PCEF) (not shown) with the appropriate traffic flow template (TFT) and QoS class of identifier (QCI), which commences the QoS and charging as specified by the application server 1242.

ADDITIONAL EXAMPLES

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

The following examples pertain to further embodiments.

Example 1 is a method for a user equipment (UE), comprising:

obtaining a Discontinuous Reception (DRX) switching command from a network device; and switching, based on the DRX switching command, from a current first Connected Mode DRX (cDRX) configuration to a different second cDRX configuration, wherein each of the first cDRX configuration and the second cDRX configuration is a configuration selected from a group consisting of:

a default cDRX configuration; and at least one non-default cDRX configuration, wherein each non-default cDRX configuration of the at least one non-default cDRX configuration comprises a cDRX periodicity and a cDRX offset corresponding to a periodicity and an offset of a Semi-Persistent Scheduling (SPS) or Configured Grant (CG) configuration, respectively.

Example 2 is the method of Example 1, wherein each non-default cDRX configuration of the at least one non-default cDRX configuration is different from the default cDRX configuration in one or more parameters selected from a group consisting of: a DRX on-duration timer, a DRX inactivity timer, a DRX slot offset, and a DRX retransmission timer.

Example 3 is the method of Example 1, wherein the DRX switching command is a Medium Access Control (MAC) Control Element (CE) or a non-scheduling Downlink Control Information (DCI) indicating the second cDRX configuration.

Example 4 is the method of Example 3, wherein switching, based on the DRX switching command, from a first cDRX configuration to a second cDRX configuration comprises:

stopping a first DRX on-duration timer for the first cDRX configuration;

stopping a first DRX inactivity timer for the first cDRX configuration; and starting a second DRX on-duration timer for the second cDRX configuration at a timing of an updated offset according to the second cDRX configuration.

Example 5 is the method of Example 4, wherein an updated offset according to a non-default cDRX configuration is based on a slot number of a downlink assignment configured for SPS, and wherein a slot number for an Nth downlink assignment is expressed by the following equation:

$$\text{(numberOfSlotsPerFrame} \times \text{SFN+slot number in the frame)}=[(\text{numberOfSlotsPerFrame} \times \text{SFNstarttime+slotstarttime})+N \times \text{periodicity} \times \text{numberOfSlotsPerFrame/10}]\text{modulo}(1024 \times \text{numberOfSlotsPerFrame}),$$

wherein numberOfSlotsPerFrame is a number of slots per frame,

SFN is a system frame number,

SFNstarttime is the start time of the system frame number, slotstarttime is the start time of the slot, and N is an integer.

Example 6 is the method of Example 4, wherein an updated offset according to a default cDRX configuration is based on a DRX start offset drx-StartOffset which is expressed by the following equation:

$$\text{drx-StartOffset}=[(\text{SFN} \times 10)+\text{subframe number}]\text{modulo}(\text{drx\_cycle)}, \text{ and}$$

wherein SFN is a system frame number and drx_cycle is a cycle of the cDRX configuration.

Example 7 is the method of Example 3, wherein in a case where two cDRX groups are configured, obtaining a DRX switching command comprises obtaining DRX switching commands per cDRX group, and switching to a second cDRX configuration comprises, for each cDRX group:

stopping a DRX on-Duration Timer for the first cDRX configuration for the cDRX group;

stopping a DRX Inactivity Timer for the first cDRX configuration for the cDRX group; and starting a new DRX on-Duration Timer for the second cDRX configuration at an updated offset based on the second cDRX configuration for the cDRX group.

Example 8 is the method of Example 3, wherein in a case where two cDRX groups are configured, a DRX switching command indicates a pair of cDRX configurations for both groups.

Example 9 is the method of Example 8, wherein the pair of cDRX configurations comprises same slot offset, DRX retransmission timer, and DRX start offset.

Example 10 is the method of Example 1, wherein the DRX switching command is a MAC CE with a fixed size.

Example 11 is the method of Example 1, wherein the DRX switching command is a scheduling based Downlink Control Information (DCI) that indicates the second cDRX configuration.

Example 12 is the method of Example 11, wherein switching, based on the DRX switching command, from a first cDRX configuration to a second cDRX configuration comprises starting a DRX on-Duration Timer for the second cDRX configuration at a timing of an updated offset according to the second cDRX configuration.

Example 13 is a method for a network device, comprising:

monitoring an activation or deactivation of a Semi-Persistent Scheduling (SPS) or Configured Grant (CG) configuration; and transmitting, based on the activation or deactivation of the SPS or CG configuration, a Discontinuous Reception (DRX) switching command to a user equipment (UE) for the UE to switch from a current first Connected Mode DRX (cDRX) configuration to a different second cDRX configuration, wherein each of the first cDRX configuration and the second cDRX configuration is a configuration selected from a group consisting of:

a default cDRX configuration; and at least one non-default cDRX configuration, wherein each non-default cDRX configuration of the at least one non-default cDRX configuration comprises a cDRX periodicity and a cDRX offset corresponding to a periodicity and an offset of the SPS or CG configuration, respectively.

Example 14 is the method of Example 13, wherein transmitting a DRX switching command comprises:

in response to determining an SPS or CG activation for an XR traffic, transmitting a DRX switching command indicating a non-default cDRX configuration corresponding to the activated SPS or CG configuration for the XR traffic.

Example 15 is the method of Example 13, wherein transmitting a DRX switching command comprises:

in response to determining an SPS or CG deactivation for an XR traffic, transmitting a DRX switching command indicating a default cDRX configuration.

Example 16 is the method of Example 13, wherein transmitting a DRX switching command comprises defining a new downlink (DL) Medium Access Control (MAC) Control Element (CE) indicating the second cDRX configuration and transmitting the MAC CE to the UE.

Example 17 is the method of Example 16, further including in response to reception of a NACK to the DRX switching command, retransmitting the DRX switching command to the UE.

Example 18 is the method of Example 13, wherein transmitting a DRX switching command comprises configuring or reconfiguring a Downlink Control Information (DCI) indicating the second cDRX configuration and transmitting the DCI to the UE.

Example 19 is the method of Example 18, wherein the DCI is a non-scheduling DCI designed with a validation field, and the method further including in response to reception of a NACK to the DRX switching command, retransmitting a DRX switching command indicating the second cDRX configuration to the UE.

Example 20 is the method of Example 18, wherein the DCI is a DCI for Physical Downlink Shared Channel (PDSCH) scheduling, and the method further including in response to reception of a NACK to the scheduled PDSCH transmission, retransmitting a DRX switching command indicating the second cDRX configuration to the UE.

Example 21 is the method of Example 18, wherein the DCI is a DCI for Physical Uplink Shared Channel (PUSCH) scheduling, and the method further including in response to reception of a NACK to the scheduled PUSCH transmission, retransmitting a DRX switching command indicating the second cDRX configuration to the UE.

Example 22 is the method of Example 13, wherein in a case where two cDRX groups are configured, transmitting a DRX switching command comprises: for each DRX group of the two cDRX groups, transmitting a DRX switching command indicating a second cDRX configuration for the DRX group.

Example 23 is the method of Example 13, wherein in a case where two cDRX groups are configured, transmitting a DRX switching command comprises transmitting a DRX switching command indicating a pair of cDRX configurations for both groups.

Example 24 is an apparatus for a user equipment (UE), the apparatus comprising:

one or more processors configured to perform steps of the method according to any of Examples 1-12.

Example 25 is an apparatus of a network device, the apparatus comprising:

one or more processors configured to perform steps of the method according to any of Examples 13-23.

Example 26 is a computer readable medium having computer programs stored thereon which, when executed by one or more processors, cause an apparatus to perform steps of the method according to any of Examples 1-23.

Example 27 is an apparatus for a communication device, comprising means for performing steps of the method according to any of Examples 1-23.

Example 28 is a computer program product comprising computer programs which, when executed by one or more processors, cause an apparatus to perform steps of the method according to any of Examples 1-23.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method comprising:

obtaining configuration information to configure a first connected mode discontinuous reception (cDRX) group having a first plurality of cDRX configurations and a second cDRX group having a second plurality of cDRX configurations, wherein a first cDRX configuration of the first plurality of cDRX configurations is paired with a first cDRX configuration of the second plurality of cDRX configurations, and paired cDRX configurations share a plurality of discontinuous reception (DRX) parameters;

determining a first serving cell is associated with the first cDRX group and a second serving cell is associated with the second cDRX group;

obtaining a DRX switching command from a network device; and switching, based on the DRX switching command, from the first cDRX configuration of the first plurality of cDRX configurations to a second cDRX configuration of the first plurality of cDRX configurations for the first cDRX group and from the first cDRX configuration of the second plurality of cDRX configurations to a second cDRX configuration of the second plurality of cDRX configurations for the second cDRX group, wherein the first cDRX configuration of the first plurality of cDRX configurations is a default cDRX configuration and the second cDRX configuration of the first plurality of cDRX configurations is a non-default cDRX configuration that includes a cDRX periodicity aligned with a Semi-Persistent Scheduling (SPS) periodicity and a cDRX start offset aligned with an SPS slot.

2. The method of claim 1, wherein the non-default cDRX configuration is different from the default cDRX configuration in one or more parameters that include: a DRX on-duration timer; a DRX inactivity timer; a DRX slot offset; or a DRX retransmission timer.

3. The method of claim 1, wherein the DRX switching command is a Medium Access Control (MAC) Control Element (CE) or a non-scheduling Downlink Control Information (DCI) indicating the second cDRX configuration.

4. The method of claim 3, wherein switching from the first cDRX configuration of the first plurality of cDRX configurations to the second cDRX configuration of the first plurality of cDRX configurations comprises:

stopping a first DRX on-duration timer for the first cDRX configuration of the first plurality of cDRX configurations;

stopping a first DRX inactivity timer for the first cDRX configuration of the first plurality of cDRX configurations; and starting a second DRX on-duration timer for the second cDRX configuration of the first plurality of cDRX configurations at a timing of an updated offset according to the second cDRX configuration of the first plurality of cDRX configurations.

5. The method of claim 4, wherein the updated offset is based on a slot number of an $N^{th}$ downlink assignment configured for SPS, and wherein the slot number (SlotNumber) satisfies:

$$(\text{numberOfSlotsPerFrame} \times \text{SFN} + \text{SlotNumber}) = [(\text{numberOfSlotsPerFrame} \times \text{SFNstarttime} + \text{slotstarttime}) + N \times \text{periodicity} \times \text{numberOfSlotsPerFrame} / 10] \bmod (1024 \times \text{numberOfSlotsPerFrame}),$$

wherein numberOfSlotsPerFrame is a number of slots per frame,

SFN is a system frame number,

SFNstarttime is a start time of the system frame number, slotstarttime is a start time of a slot corresponding to the slot number, and N is an integer.

6. The method of claim 4, wherein an updated offset according to a default cDRX configuration is based on a DRX start offset (drx-StartOffset) that is expressed by:

$$\text{drx-StartOffset} = [(\text{SFN} \times 10) + \text{subframe number}] \bmod (\text{drx\_cycle}),$$

wherein SFN is a system frame number and drx_cycle is a cycle of the default cDRX configuration.

7. The method of claim 1, wherein the plurality of DRX parameters include a slot offset, DRX retransmission timer, and DRX start offset.

8. The method of claim 1, wherein the DRX switching command is a MAC CE with a fixed size.

9. The method of claim 1, wherein the DRX switching command is a scheduling based Downlink Control Information (DCI) that indicates the second cDRX configuration of the first plurality of cDRX configurations.

10. The method of claim 9, wherein switching from the first cDRX configuration of the first plurality of cDRX configurations to the second cDRX configuration of the first plurality of cDRX configurations comprises:

starting a DRX on-Duration Timer for the second cDRX configuration of the first plurality of cDRX configurations at a timing of an updated offset according to the second cDRX configuration of the first plurality of cDRX configurations.

11. A method comprising:

generating, for transmission to a user equipment (UE), configuration information to configure a first connected mode discontinuous reception (cDRX) group having a first plurality of cDRX configurations and a second cDRX group having a second plurality of cDRX configurations, wherein a first cDRX configuration of the first plurality of cDRX configurations is paired with a first cDRX configuration of the second plurality of cDRX configurations, paired cDRX configurations share a plurality of discontinuous reception (DRX) parameters, and a first serving cell is associated with the first cDRX group and a second serving cell is associated with the second cDRX group;

monitoring an activation or deactivation of a Semi-Persistent Scheduling (SPS) or Configured Grant (CG) configuration; and generating, based on the activation or deactivation of the SPS or CG configuration, a DRX switching command for transmission to the UE for the UE to switch from the first cDRX configuration of the first plurality of cDRX configurations to a second cDRX configuration of the first plurality of cDRX configurations for the first cDRX group and from the first cDRX configuration of the second plurality of cDRX configurations to a second cDRX configuration of the second plurality of cDRX configurations for the second cDRX group, wherein the first cDRX configuration of the first plurality of cDRX configurations is a default cDRX configuration and the second cDRX configuration of the first plurality of cDRX configurations is a non-default cDRX configuration that includes a cDRX periodicity aligned with an SPS periodicity and a cDRX start offset aligned with an SPS slot.

12. The method of claim 11, wherein generating the DRX switching command comprises:

in response to determining an activation of an SPS or CG configuration for an XR traffic, generating the DRX switching command to indicate the second cDRX configuration of the first plurality of cDRX configurations for the XR traffic.

13. The method of claim 11, wherein generating the DRX switching command comprises:

in response to determining an SPS or CG deactivation for an XR traffic, generating the DRX switching command to indicate the first cDRX configuration of the first plurality of cDRX configurations.

14. The method of claim 11, wherein the DRX switching command comprises a downlink (DL) Medium Access Control (MAC) Control Element (CE) to indicate the second cDRX configuration.

15. The method of claim 14, further comprising:

in response to reception of a NACK to the DRX switching command, retransmitting the DRX switching command to indicate the second cDRX configuration of the first plurality of cDRX configurations to the UE.

16. The method of claim 11, wherein the DRX switching command comprises Downlink Control Information (DCI) to indicate the second cDRX configuration of the first plurality of cDRX configurations.

17. The method of claim 16, wherein the DCI is a non-scheduling DCI designed with a validation field, and the method further comprises:

in response to reception of a NACK to the DRX switching command, retransmitting the DRX switching command to indicate the second cDRX configuration of the first plurality of cDRX configurations to the UE.

18. The method of claim 16, wherein the DCI is to schedule a Physical Downlink Shared Channel (PDSCH) transmission, and the method further comprises:

in response to reception of a NACK to the PDSCH transmission, retransmitting the DRX switching command to indicate the second cDRX configuration of the first plurality of cDRX configurations to the UE.

19. An apparatus comprising:

processing circuitry to:

obtain configuration information to configure a first connected mode discontinuous reception (cDRX) group having a first plurality of cDRX configurations and a second cDRX group having a second plurality of cDRX configurations, wherein a first cDRX configuration of the first plurality of cDRX configurations is paired with a first cDRX configuration of the second plurality of cDRX configurations, and paired cDRX configurations share a plurality of discontinuous reception (DRX) parameters;

determine a first serving cell is associated with the first cDRX group and a second serving cell is associated with the second cDRX group;

obtain a DRX switching command from a network device; and switch, based on the DRX switching command, from the first cDRX configuration of the first plurality of cDRX configurations to a second cDRX configuration of the first plurality of cDRX configurations for the first cDRX group and from the first cDRX configuration of the second plurality of cDRX configurations to a second cDRX configuration of the second plurality of cDRX configurations for the second cDRX group, wherein the first cDRX configuration of the first plurality of cDRX configurations is a default cDRX configuration and the second cDRX configuration of the first plurality of cDRX configurations is a non-default cDRX configuration that includes a cDRX periodicity aligned with a Semi-Persistent Scheduling (SPS) periodicity and a cDRX start offset aligned with an SPS slot.

20. The apparatus of claim 19, wherein the non-default cDRX configuration is different from the default cDRX configuration in one or more parameters that include: a DRX on-duration timer; a DRX inactivity timer; a DRX slot offset; or a DRX retransmission timer.

\* \* \* \* \*